US012108485B2

(12) United States Patent
Shah et al.

(10) Patent No.: US 12,108,485 B2
(45) Date of Patent: Oct. 1, 2024

(54) ELECTRONIC DEVICE PROVIDING DATA SERVICE AND OPERATING METHOD THEREOF

(71) Applicant: Samsung Electronics Co., Ltd., Suwon-si (KR)

(72) Inventors: Nitesh Pushpak Shah, Bangalore (IN); Aman Agarwal, Bangalore (IN); Kailash Kumar Jha, Bangalore (IN); Alok Kumar Jangid, Bangalore (IN); Hitesh Wadhwa, Bangalore (IN); Subbarayudu Mutya, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 17/513,753

(22) Filed: Oct. 28, 2021

(65) Prior Publication Data

US 2022/0132294 A1 Apr. 28, 2022

Related U.S. Application Data

(63) Continuation of application No. PCT/KR2021/015348, filed on Oct. 28, 2021.

(30) Foreign Application Priority Data

Oct. 28, 2020 (IN) .............................. 202041047068
Oct. 26, 2021 (IN) .............................. 202041047068

(51) Int. Cl.
*H04W 8/02* (2009.01)
*H04W 88/06* (2009.01)

(52) U.S. Cl.
CPC .............. *H04W 8/02* (2013.01); *H04W 88/06* (2013.01)

(58) Field of Classification Search
None
See application file for complete search history.

(56) References Cited

U.S. PATENT DOCUMENTS 9,066,330 B2 6/2015 Hang et al.
2013/0150032 A1 6/2013 Pattaswamy et al.
(Continued)

FOREIGN PATENT DOCUMENTS

| CN | 108924887 A | 11/2018 |
| WO | 2020045952 A1 | 3/2020 |
| WO | 2020125583 A1 | 6/2020 |

OTHER PUBLICATIONS

International Search Report and Written Opinion of the International Searching Authority dated Feb. 4, 2022, in connection with International Application No. PCT/KR2021/015348, 7 pages.

(Continued)

*Primary Examiner* — Adolf Dsouza

(57) ABSTRACT

A method of operating an electronic device includes determining initiation of a voice call on a first Subscriber Identity Module (SIM), while availing first data services through the first SIM. The initiation of a voice call leads to a fallback from a first Radio Access Technology (RAT). A Default Data Subscription/Service (DDS) is set to the first SIM. Further, the method includes registering with a first network through a second SIM, in response to determining the second SIM is registered with a second network with a second RAT. The method includes availing the first data services from the second SIM that is registered with the first network, while engaging in the voice call on the first SIM.

20 Claims, 19 Drawing Sheets

(56) References Cited

U.S. PATENT DOCUMENTS

| | | | |
|---|---|---|---|
| 2015/0094071 A1* | 4/2015 | Hang | H04W 76/19 |
| | | | 455/450 |
| 2015/0281929 A1 | 10/2015 | Shih et al. | |
| 2016/0029222 A1 | 1/2016 | Su et al. | |
| 2018/0007602 A1 | 1/2018 | Jamadagni et al. | |
| 2018/0160422 A1 | 6/2018 | Pathak et al. | |
| 2018/0220329 A1* | 8/2018 | Arumugam et al. | |
| 2018/0255486 A1* | 9/2018 | Kumar | H04W 28/0983 |
| 2018/0332428 A1* | 11/2018 | Gupta | H04L 61/5038 |
| 2018/0359284 A1* | 12/2018 | Kotreka | H04B 1/3816 |
| 2018/0368099 A1* | 12/2018 | Chen | H04W 48/18 |
| 2020/0053545 A1 | 2/2020 | Wong et al. | |
| 2020/0068647 A1* | 2/2020 | Jha | H04W 60/005 |
| 2022/0007171 A1 | 1/2022 | Wang | |

OTHER PUBLICATIONS

Examination report dated May 27, 2022, in connection with Indian Application No. 202041047068, 6 pages.

* cited by examiner

ELECTRONIC DEVICE PROVIDING DATA SERVICE AND OPERATING METHOD THEREOF

CROSS REFERENCE TO RELATED APPLICATIONS

This application is a continuation of International Application No. PCT/KR2021/015348 designating the United States, filed on Oct. 28, 2021, in the Korean Intellectual Property Receiving Office and claiming priority to Indian Provisional Patent Application No. 202041047068, which was filed on Oct. 28, 2020, and Indian Complete Patent Application No. 202041047068, which was filed on Oct. 26, 2021, the disclosures of which are herein incorporated by reference in their entirety.

BACKGROUND

1. Field

Embodiments herein relate to dual Subscriber Identity Module (SIM) devices supporting $5^{th}$ Generation (5G) services, and more particularly to methods and systems for providing 5G data speeds during a call in a dual SIM User Equipment (UE).

2. Description of Related Art

With the advent of $5^{th}$ Generation (5G) services, Mobile Network Operators (MNOs) are either following Network option-3 or Network option-2 for 5G deployment. In Network option-3, a Long Term Evolution (LTE) network supports addition of Secondary Cell Group (SCG) Bearers for facilitating reception of the 5G services. In Network option-2, a New Radio (NR) Standalone (SA) network either supports Evolved Packet System (EPS) fallback or Voice over NR (VoNR) for facilitating voice call services. In the Network option-3 deployment, for most of the MNOs, when a call is triggered, the SCG bearers are released by the network temporarily during the call. After the call ends, the SCG bearers can be added if 5G Cell is still available. In case of NR SA deployment (Network option-2), the MNOs prefer the EPS fallback option for voice calls, in which the network redirects a User Equipment (UE) to the LTE network for completing the voice calls over Voice over LTE (VoLTE).

The network deployments (Network option-3 or Network option-2), prevent the user to avail 5G Data services during Call. This can significantly degrade user experience for 5G device users. For example, if the user was using Mobile Hotspot or Tethering, or was involved in Online Gaming (games requiring High Data Speeds or Ultra Low Latency), the user would be interrupted and will be unable to use 5G Data/Latency services during the call.

From the perspective of a chipset vendor or an Original Equipment Manufacturer (OEM), the existing chipset can support 5G mode on one Subscriber Identity Module (SIM) card while the other SIM card still remains in $4^{th}$ Generation (4G) mode or other legacy Radio Access Technologies (RATs). However, some chipsets can provide support for 5G mode on both the SIM cards simultaneously. In conventional Dual SIM-Dual Standby (DSDS) devices, the issue that remains persistent is that whenever a voice call is on-going on one SIM card, the other SIM card goes "Out-of-Service" or is "Not reachable". Thus, the other SIM card cannot be used for voice/data services". FIG. 1 depicts an example scenario, wherein SIM 2 goes "Out-of-Service" or is "Not reachable" when a VoLTE call is on-going on SIM 1. Therefore, when a DSDS device receives a call on a first SIM card set to the 4G Mode, with the Default Data SIM/Subscription/Service (DDS) set on a second SIM card set to the 5G Mode, the data connection of the DSDS device is lost as the second SIM card will go out of service.

To overcome this issue, a feature was introduced in the DSDS devices that enabled availing data services during a call. The feature allowed automatic setting of DDS on the SIM card on which the call was triggered. FIG. 2 depicts an example scenario, wherein the DDS is set to SIM 1 from SIM 2 when a VoLTE call is triggered on SIM 1. Consider that 5G data services were being received through SIM 2 prior to the triggering of the VoLTE call. When the VoLTE call is triggered on SIM 1, there is EPS fallback on SIM 1 and SIM 2 goes "Out-of-Service" or is "Not reachable". Thus, automatic DDS setting from SIM 2 to SIM 1 allows continuous data service receptivity. However, as the call was triggered on a SIM card set to a non-5G RAT (4G), the user may not be able to avail data services at 5G speeds or other 5G services.

However, some OEMs or chipset vendors are working on solutions that can provide support for VoLTE Call on a first SIM card and 5G Data Services on a second SIM card simultaneously. However, with this solution, there can be scenarios wherein the users may not be able to receive 5G services during call if the DDS is set or moved (e.g., switched) to a SIM card which does not support 5G mode. Considering that the DDS is set or moved to a SIM card supporting 5G mode, the users may not be able to receive 5G services during the call if the SIM card operator is unable to provide support for VoNR calls or support addition of SCG bearers during the call. The user experience of the 5G device users will be degraded as the reception of the 5G services is interrupted.

For example, consider that the user was engaged in Online Gaming prior to the triggering of a call. When the call is triggered, the game gets interrupted (as data connection is lost during the incoming call). If the data services resume through automatic setting of DDS on the SIM card on which the call is triggered, or through a feature enabling VoLTE Call on the first SIM card and 5G Data Services on the second SIM card, the game may lag, the gaming performance may get affected as the data speed or latency would be affected during the call on the second SIM card, or the game may be prematurely terminated. This may lead to a poor gaming experience.

FIG. 3 depicts an example scenario, wherein 5G data services, in a UE, are interrupted due to triggering of a voice call. The UE can be a dual SIM device providing simultaneous support for 5G services on SIM 1 and SIM 2 or a dual SIM device providing support for 5G services on SIM 1 and 4G services on SIM 2. As depicted in FIG. 3, when a voice call is dialed or received on SIM 1 and if the DDS is set to SIM 1, either SCG bearers providing 5G data services to the UE are released (network option 3), or there is an EPS fallback (network option 2). This can lead to data connection over 4G instead of 5G during the voice call. The voice call continues on SIM 1 over VoLTE and Data Connection goes over 4G on SIM 1 instead of 5G during the call.

FIG. 4 depicts another example scenario, wherein 5G data services are interrupted due to triggering of a voice call. The UE can be a dual SIM device providing support for 5G services on SIM 1 and 4G services on SIM 2. As depicted in FIG. 4, when a voice call is dialed or received on SIM 2 and if the DDS is set to SIM 1, 5G data services at the UE on SIM 1 is interrupted. The interruption can be due to releasing 5G connection on SIM 1 due to triggering of the call on SIM 2 (SIM 1 goes "out of service" or is "not reachable" as long as the UE engages in the voice call) or due to automatic setting of the DDS from SIM 1 to SIM 2 when the call is triggered on SIM 2. When the DDS is set to SIM 2 (from SIM 1), after the triggering of the voice call on SIM 2, SIM 2 provides 4G data services to the UE (SIM 2 will not provide 5G data services).

The principal object of the embodiments herein is to disclose methods and systems for enabling users to avail $5^{th}$ Generation (5G) data services during engagement in a voice call.

Another object of the embodiments herein is to avail the 5G data services through a second Subscriber Identity Module (SIM) while engaging in a call through a first SIM, if a call is initiated on the first SIM while availing the 5G data services through the first SIM, wherein the second SIM needs to register with a 5G network prior to the user availing the 5G data services through the second SIM, if the second SIM is not registered with the 5G network or is registered with a different Radio Access Technology (RAT) (e.g., a wireless network with a different RAT), wherein the 5G data services are availed through the first SIM after completion of the call.

Another object of the embodiments herein is to avail 5G data services through the second SIM, if a call is initiated on the second SIM while availing the 5G data services through the first SIM, wherein the second SIM registers with a 5G network prior to the user availing the 5G data services through the second SIM, wherein the 5G network supports Voice over New Radio (VoNR) call or supports addition of Secondary Cell Group (SCG) bearers during the call, wherein the call is converted to a VoNR call or the 5G data services are availed through the SCG bearers, wherein the 5G data services are availed through the first SIM after completion of the call.

Another object of the embodiments herein is to forward all incoming calls to the first SIM on detecting that a call is initiated on the second SIM while availing the 5G data services through the first SIM, wherein the incoming call is either converted to a VoNR call or the 5G data services are availed through SCG bearers.

Another object of the embodiments herein is to reject all incoming calls on the second SIM if the 5G data services are being availed through the first SIM, and send a phone number associated with the first SIM through the second SIM.

Another object of the embodiments herein is to trigger a second SIM Internet protocol Multimedia Subsystem (IMS) registration over the first SIM through a Non-3GPP Access Inter-Working Function (N3IWF) to enable reception of all second SIM incoming calls over the first SIM while availing the 5G data services through the first SIM.

SUMMARY

Accordingly, the embodiments provide methods and systems for enabling users to avail $5^{th}$ Generation (5G) data services in a User Equipment (UE) during engagement in a voice call. The UE is a Dual Subscriber Identity Module (SIM) Dual Connectivity (DSDS) device. The embodiments include detecting triggering of a voice call in the UE. The voice call can be a Voice over Long Term Evolution (VoLTE) call. In an embodiment, consider that 5G data services are received on SIM 1 of the UE. The embodiments include setting the DDS to SIM 2 of the UE, on detecting that a VoLTE call has been triggered on SIM 1. If the UE supports 5G mode on both SIM 1 and SIM 2 simultaneously, the DDS can be set from SIM 1 to SIM 2 when the VoLTE call is triggered on SIM 1 (as 5G data services were received on SIM 1 prior to the triggering of the VoLTE call on SIM 1). This ensures availability of 5G services at the UE (on SIM 2) during the VoLTE call (on SIM 1). It the UE provides support for 4G services on one SIM and 5G services on the other SIM at the same time, then the UE can trigger registration with a 5G network on SIM 2 to continue receiving 5G services on SIM 2, while engaging on the VoLTE call (4G service) on SIM 1. Once the registration with the 5G network is completed on SIM 2, the DDS is set to SIM 2.

Consider that 5G data services are received on SIM 1 and that the UE supports addition of Secondary Cell Group (SCG) bearers during the VoLTE call. In an embodiment, if a VoLTE call is triggered in SIM 2, the embodiments include setting the DDS from SIM 1 to SIM 2. This enables reception of 5G data services on SIM 2 using SCG bearers during the VoLTE call on SIM 2. If there is support provided for Voice over New Radio (VoNR), the VoLTE call can be converted to a VoNR call. In this scenario, addition of SCG bearers may be omitted. In an embodiment, if the VoLTE call is triggered in SIM 2, the VoLTE call is forwarded to SIM 1. The VoLTE call can be either converted to a VoNR call or SCG bearers can be added for reception of 5G data services on SIM 1 after the VoLTE call is forwarded to SIM 1 (from SIM 2). This enables reception of 5G data services and engagement in the VoNR call or Voice call simultaneously on SIM 1. In an embodiment, if the VoLTE call is triggered in SIM 2, the VoLTE call can be rejected. The embodiments include sending a message through SIM 2, which includes a number associated with SIM 1. In an embodiment, if the VoLTE call is triggered in SIM 2, Internet protocol Multimedia Subsystem (IMS) registration can be triggered over SIM 1 through Non-3GPP Access Inter-Working Function (N3IWF). This enables reception of all VoLTE calls on SIM 1 that are incoming on SIM 2. Thus, the reception of 5G data services can continue on SIM 1 while incoming VoLTE calls on SIM 2 are directed to SIM 1. The VoLTE calls (directed to SIM 1 and received at SIM 1) can be either converted to VoNR calls or SCG bearers can be added for continuous reception of 5G data services on SIM 1.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
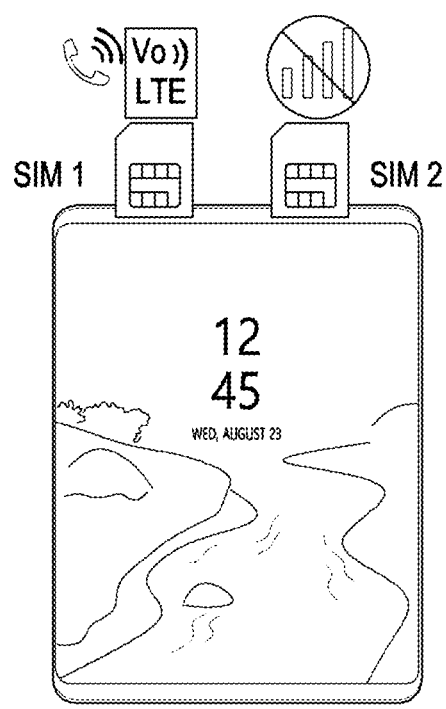
FIG. 1 depicts an example scenario, wherein Subscriber Identity Module (SIM) 2 goes "Out-of-Service" or is "Not reachable" when a Voice over Long Term Evolution (VoLTE) call is on-going on SIM 1.
Figure 2:
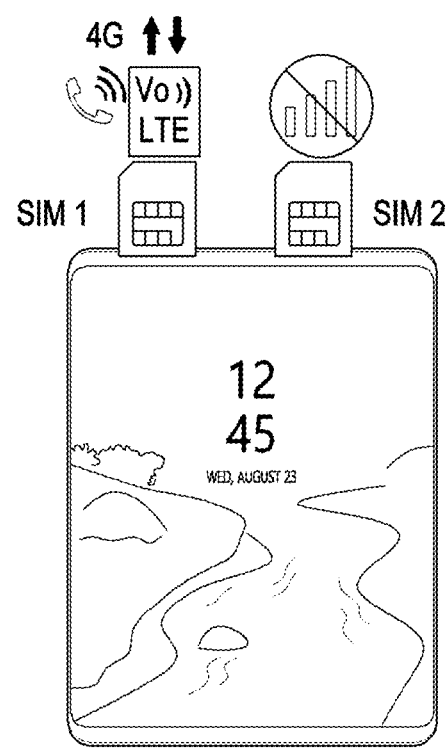
FIG. 2 depicts an example scenario, wherein the DDS is set to SIM 1 from SIM 2 when a VoLTE call is triggered on SIM 1.
Figure 3:
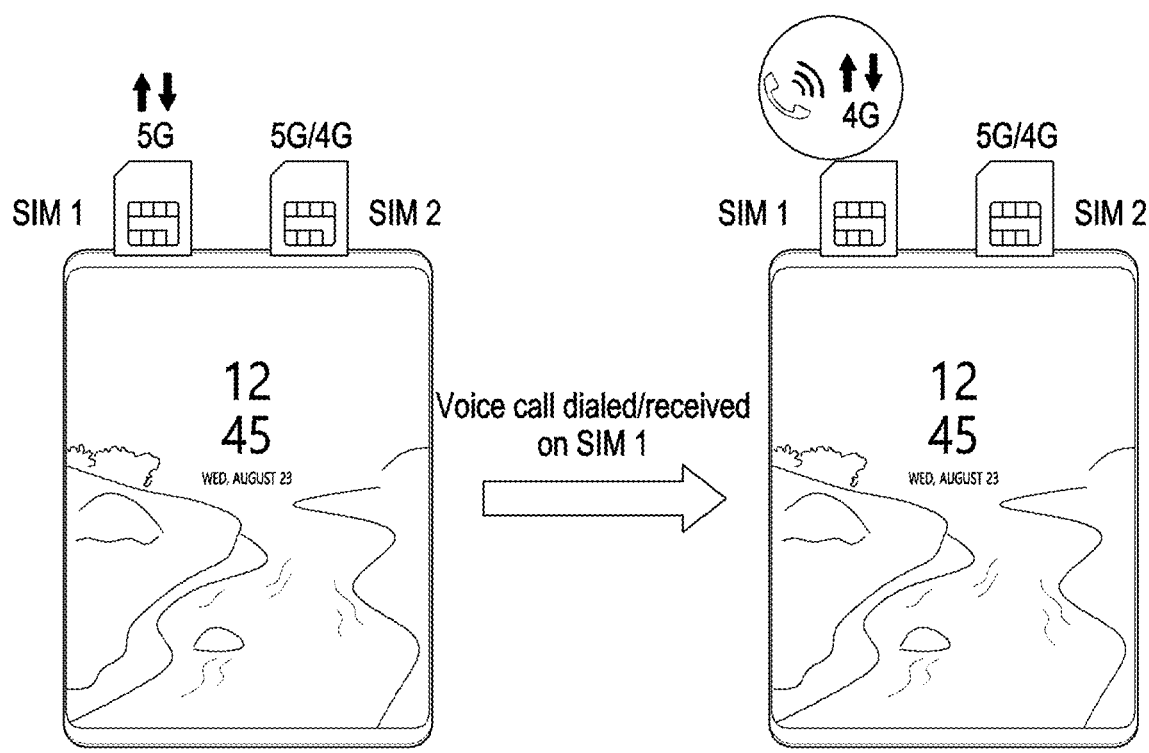
FIG. 3 depicts an example scenario, wherein 5$^{th}$ Generation (5G) data services, in a User Equipment (UE), are interrupted due to triggering of a voice call.
Figure 4:
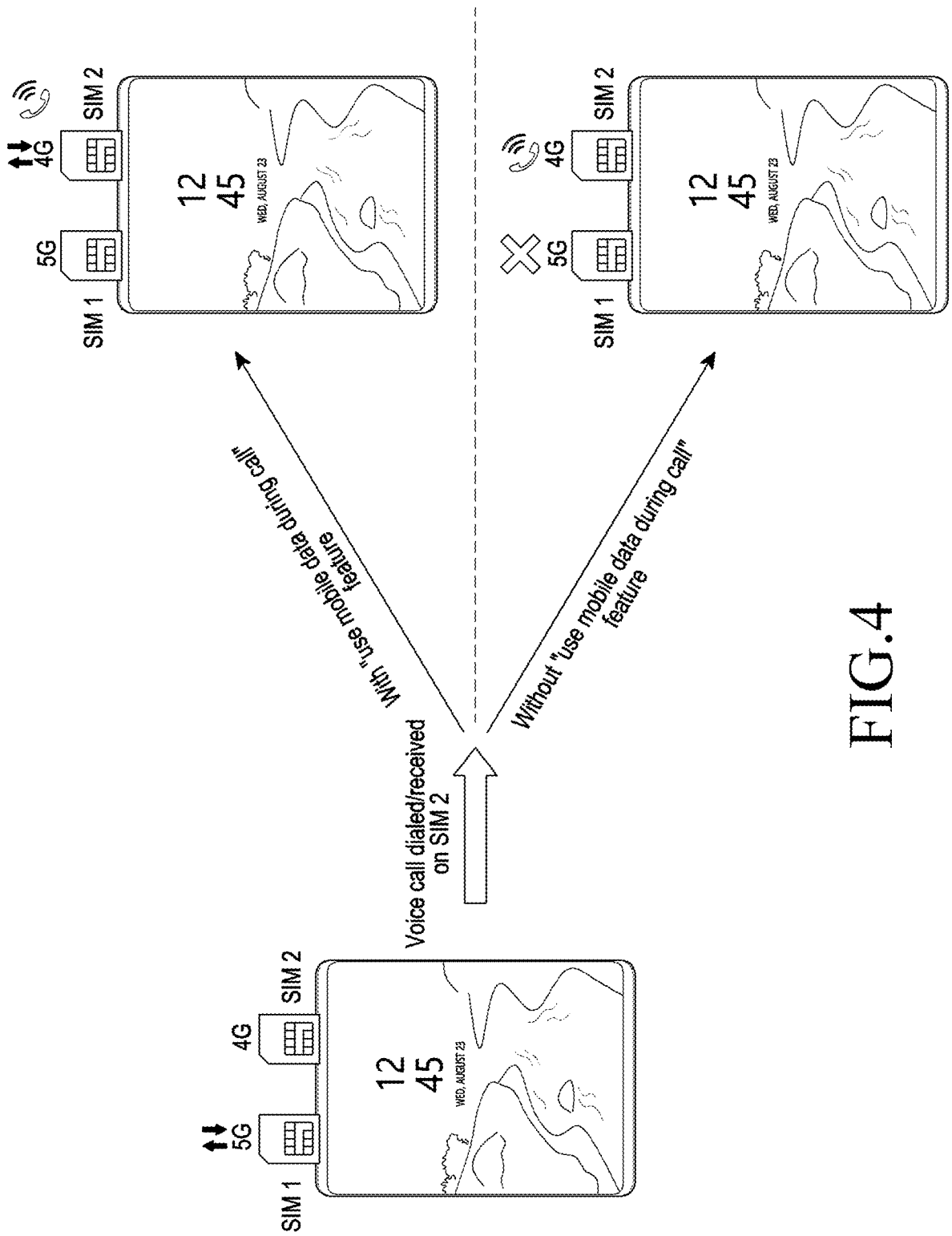
FIG. 4 depicts another example scenario, wherein 5G data services are interrupted due to triggering of a voice call.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for enabling users to avail $5^{th}$ Generation (5G) data services in a User Equipment (UE) during engagement in a voice call. The UE is a Dual Subscriber Identity Module (SIM) Dual Connectivity (DSDS) device. According to an embodiment, the UE may be an electronic device. According to an embodiment, the UE may include a communication circuit (or a communication interface), and at least one processor operatively connected to the communication circuit. In an embodiment herein, the UE may comprise of a plurality of 5G antennas (transceivers). In an embodiment herein, the UE may comprise of one 5G antenna (transceiver) and at least one 4G antenna (transceiver).

In an embodiment, consider that SIM 1 of the UE is availing 5G services and is using a 5G antenna present in the UE for availing 5G services. When an incoming/outgoing Voice over Long Term Evolution (VoLTE) call is triggered on SIM 1 of the UE, and if 5G data services are being received on SIM 1, the DDS is set to SIM 2 of the UE. If SIM 2 is not registered with a 5G network, the embodiments trigger registration with the 5G network on SIM 2 after DDS is set to SIM 2. Further, the 5G antenna is moved (e.g., set or switched) from SIM 1 to SIM 2 (i.e., the SIM 1 stops availing 5G using the 5G antenna and the SIM 2 is able to use the 5G antenna to avail 5G services). When DDS is set to SIM 2 and the 5G antenna has been moved from SIM 1 to SIM 2, 5G data services can be received on SIM 2 using the 5G antenna, during the engagement in the VoLTE on SIM 1. Once the VoLTE call terminates, the DDS is set to SIM 1 and the 5G antenna is moved back from SIM 2 to SIM 1.

In another embodiment, consider that SIM 1 is availing 5G data services (i.e., SIM 1 is using the 5G antenna to avail 5G data services). If a VoLTE call is triggered on SIM 2, the DDS can be set to SIM 2 of the UE. Further, the 5G antenna is moved from SIM 1 to SIM 2 (i.e., the SIM 1 stops availing 5G using the 5G antenna and the SIM 2 is able to use the 5G antenna to avail 5G services). When DDS is set to SIM 2, embodiments trigger registration with the 5G network on SIM 2. After registration, 5G data services can be received on SIM 2 during the VoLTE call using the 5G antenna, either using SCG bearers or the VoLTE call can be converted to a Voice over New Radio (VoNR) call. Thus, 5G data services can be received on SIM 2 during the engagement in the VoLTE or VoNR Call on SIM 2. Once the VoLTE/VoNR call terminates, DDS is set to SIM 1.

In yet another embodiment, consider that SIM 1 is availing 5G data services (i.e., SIM 1 is using the 5G antenna to avail 5G data services). If a VoLTE call is triggered on SIM 2, in an embodiment herein, all incoming calls of SIM 2 are forwarded to SIM 1 till 5G data services are received on SIM 1, incoming calls of SIM 2 are auto-rejected and a message including a number associated with SIM 1 is sent. In an embodiment herein, Internet protocol Multimedia Subsystem (IMS) Registration of SIM 2 on SIM 1 is triggered through Non-3GPP Access Inter-Working Function (N3IWF)

Referring now to the drawings, and more particularly to FIGS. 5 through 19, where similar reference characters denote corresponding features consistently throughout the figures, there are shown embodiments.

Figure 5:
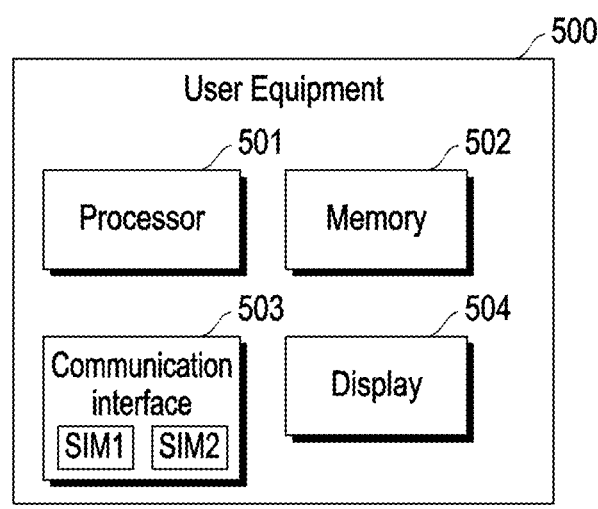
FIG. 5 depicts various units of a UE configured to provide 5G data services to a user when the user is engaged in a voice call, according to embodiments as disclosed herein.

FIG. 5 depicts various units of a UE 500 configured to provide 5G data services to a user when the user is engaged in a voice call, according to embodiments as disclosed herein. According to an embodiment, the UE 500 may be an electronic device. As depicted in FIG. 5, the UE 500 includes a processor 501, a memory 502, a communication interface (or a communication circuit) 503 and a display 504. The UE 500 can provide 5G data Services during a voice call in scenarios where either 5G data service is not available during a voice call or 5G data services fallback to $4^{th}$ Generation (4G) during the voice call. When DDS is set to SIM 1 and if the processor 501 detects triggering of a voice call on SIM 1 (because of which SIM 1 loses 5G connection and fallbacks to 4G), then based on whether the SIM 2 is registered with a 5G network or a 4G network, the processor 501 can set DDS to SIM 2 and move the 5G antenna to SIM 2. The processor 501 triggers registration with the 5G network on SIM 2, to enable reception of 5G data services during the voice call using the 5G antenna, if SIM 2 is not registered with the 5G network.

The UE 500 utilizes a feature of simultaneous VoLTE call and 5G data on different SIM cards to provide 5G data services during the VoLTE call. Consider that initially SIM 1 is registered with the 5G network and 5G data services are received on SIM 1. When a VoLTE call is initiated or received on SIM 1, the UE 500 performs specific functions based on capabilities of the UE 500.

$1^{st}$ Embodiment: When the VoLTE call is initiated or received on SIM 1 and if 5G data services are received on SIM 1, the processor 501 can enable 5G on SIM 2 (if SIM 2 was initially on 4G or if the UE 500 does not support 5G simultaneously in SIM 1 and SIM 2) by moving the 5G mode from SIM 1 to SIM 2 and moving the 5G antenna from SIM 1 to SIM 2. Once the mode of SIM 2 is set to 5G (from SIM 1), the processor 501 can set DDS to SIM 2. If the SIM 2 was on 5G, the processor 501 can set DDS to SIM 2 immediately after the initiation of the VoLTE call (the UE 500 supports 5G simultaneously in SIM 1 and SIM 2). The 5G antenna is also moved from SIM 1 to SIM 2. This allows the user to avail 5G data services during the VoLTE call. After the completion of the VoLTE call, the processor 501 may set DDS to SIM 1. If the UE 500 does not support 5G simultaneously in SIM 1 and SIM 2, the processor 501 sets the mode of SIM 2 to 4G.

$2^{nd}$ Embodiment: Consider the 5G network, to which the UE 500 is connected, supports VoNR calls or supports addition of SCG bearers during the VoLTE call. When the processor 501 detects that a VoLTE call is dialed or received on SIM 2, which is in 4G mode, while 5G data services are received on SIM 1 (consider that the UE 500 does not support 5G simultaneously in SIM 1 and SIM 2), the processor 501 can change the mode of SIM 2 to 5G and DDS to SIM 2. When SIM 2 is in 5G mode, and if the 5G network supports VoNR calls, the VoLTE call can be converted to a VoNR call (network option 2) (on the 5G network determining that the VoLTE call can be converted to the VoNR call (based on information provided to the 5G network by the UE about 5G capabilities of the SIM 2 (using any suitable information element/communication element)) and the 5G Network provides an indication to the UE 500 to switch the VoLTE call to the VoNR call). If the addition of SCG bearers is supported (network option 3), the VoLTE call can continue and SCG bearers can be added during the VoLTE call to enable the user to avail 5G data services during the VoLTE call (as DDS is set to SIM 2), when the VoLTE call is received. After the completion of the VoLTE call, the processor 501 may set DDS to SIM 1.

3rd Embodiment: Consider that an incoming call is received on SIM 2, the 5G network supports VoNR calls or supports addition of SCG bearers during the VoLTE call, and the UE 500 does not support 5G simultaneously in SIM 1 and SIM 2. Consider that SIM 1 is in 5G mode and SIM 2 is in 4G mode. In a first aspect, the processor 501 can enable VoLTE call forwarding, wherein all incoming calls of SIM 2 are forwarded to SIM 1, when the user is availing 5G data services on SIM 1. Therefore, either SCG bearers are added during the VoLTE call to enable the user to avail 5G data services during the VoLTE call (network option 3) or the forwarded VoLTE call can be converted to a VoNR call (network option 2). The processor 501 can enable the VoLTE call forwarding option as long as the user avails 5G data services on SIM 1. One or more 4G antennas present in the UE 500 can be used in an interleaved manner.

In a second aspect, the processor 501 can enable auto call reject, wherein all incoming calls of SIM 2 are automatically rejected and a call reject message is sent through SIM 2 that includes a phone number associated with SIM 1. When there is an incoming VoLTE call on SIM 2, the VoLTE call gets automatically rejected with a message (which can be any one or combination of a text message, a Short Message Service (SMS), an instant message, and so on) having SIM 1 number sent to the caller. The processor 501 can enable the auto call reject option as long as the user avails 5G data services on SIM 1.

In a third aspect, the processor 501 can enable triggering of SIM 2 IMS registration over SIM 1 through the N3IWF. All incoming VoLTE calls on SIM 2 can be received over SIM 1. The processor 501 can receive all incoming VoLTE calls on SIM 1 as long as the user avails 5G data services on SIM 1.

FIG. 5 shows exemplary units of the UE 500, but it is to be understood that other embodiments are not limited thereon. In other embodiments, the UE 500 may include fewer or more components (e.g., units). Further, the labels or names of the units of the UE 500 are used only for illustrative purpose and does not limit the scope of the invention. One or more units can be combined together to perform same or substantially similar function in the UE 500.

Figure 6:
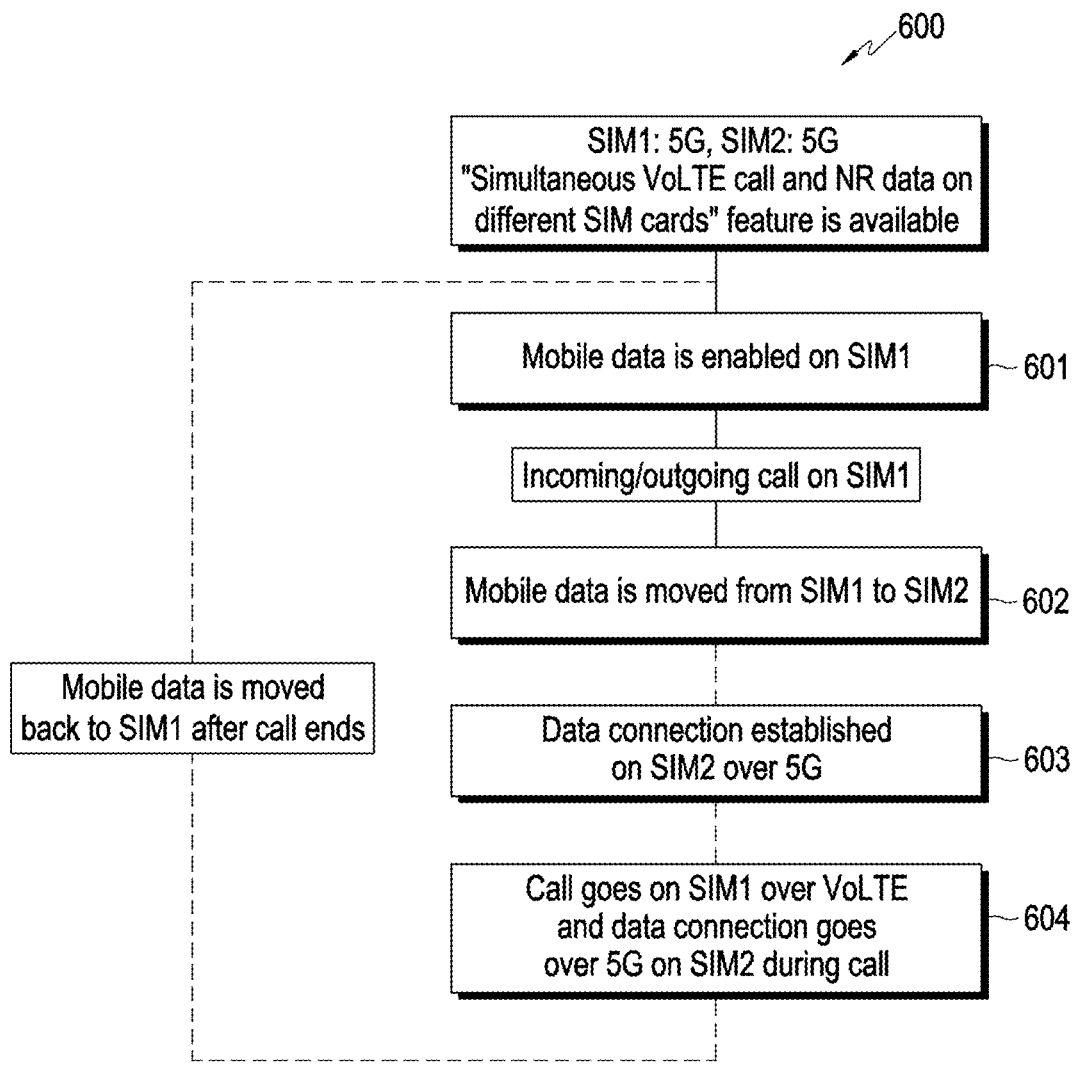
FIG. 6 is a flowchart detecting a method for providing 5G data services to the UE during a VoLTE call, wherein 5G data services are being availed on SIM 1 of the UE when the VoLTE call is triggered on SIM 1, according to embodiments as disclosed herein.

FIG. 6 is a flowchart detecting a method 600 for providing 5G data services to the UE 500 during a VoLTE call, wherein 5G data services are being availed on SIM 1 of the UE 500 when the VoLTE call is triggered on SIM 1, according to embodiments as disclosed herein. Consider that 5G feature is supported by the UE 500 simultaneously on SIM 1 and SIM 2. The UE 500 supports VoLTE Call and 5G data services simultaneously on SIM 1 and SIM 2. At step 601, the method includes enabling mobile data, i.e., 5G data services, on SIM 1. Thereafter, the user can avail 5G data services on SIM 1. At this instance, consider that a VoLTE call (incoming or outgoing) has been triggered on SIM 1. At step 602, the method includes enabling mobile data, i.e., 5G data services on SIM 2 after detecting that the VoLTE call is triggered.

At step 603, the method includes establishing a 5G data connection over SIM 2. As the UE 500 supports the 5G feature simultaneously on SIM 1 and SIM 2, the SIM 2 is likely to register with a 5G network. Thus, the SIM 2 would be able to provide 5G data services when the mobile data is enabled on SIM 2. At step 604, the method includes enabling the user to avail 5G data services on SIM 2 by switching DDS (from SIM 1 to SIM 2) and moving the 5G antenna from SIM 1 to SIM 2, as long as the user is engaged in the VoLTE call on SIM 1. Once the VoLTE call is terminated, the mobile data can be enabled again on SIM 1 (step 601) by switching DDS back to SIM 1 from SIM 2 and moving the 5G antenna from SIM 2 to SIM 1.

The various actions in the method 600 may be performed in the order presented, in a different order, or simultaneously. Further, in some embodiments, some actions listed in FIG. 6 may be omitted.

Figure 7:
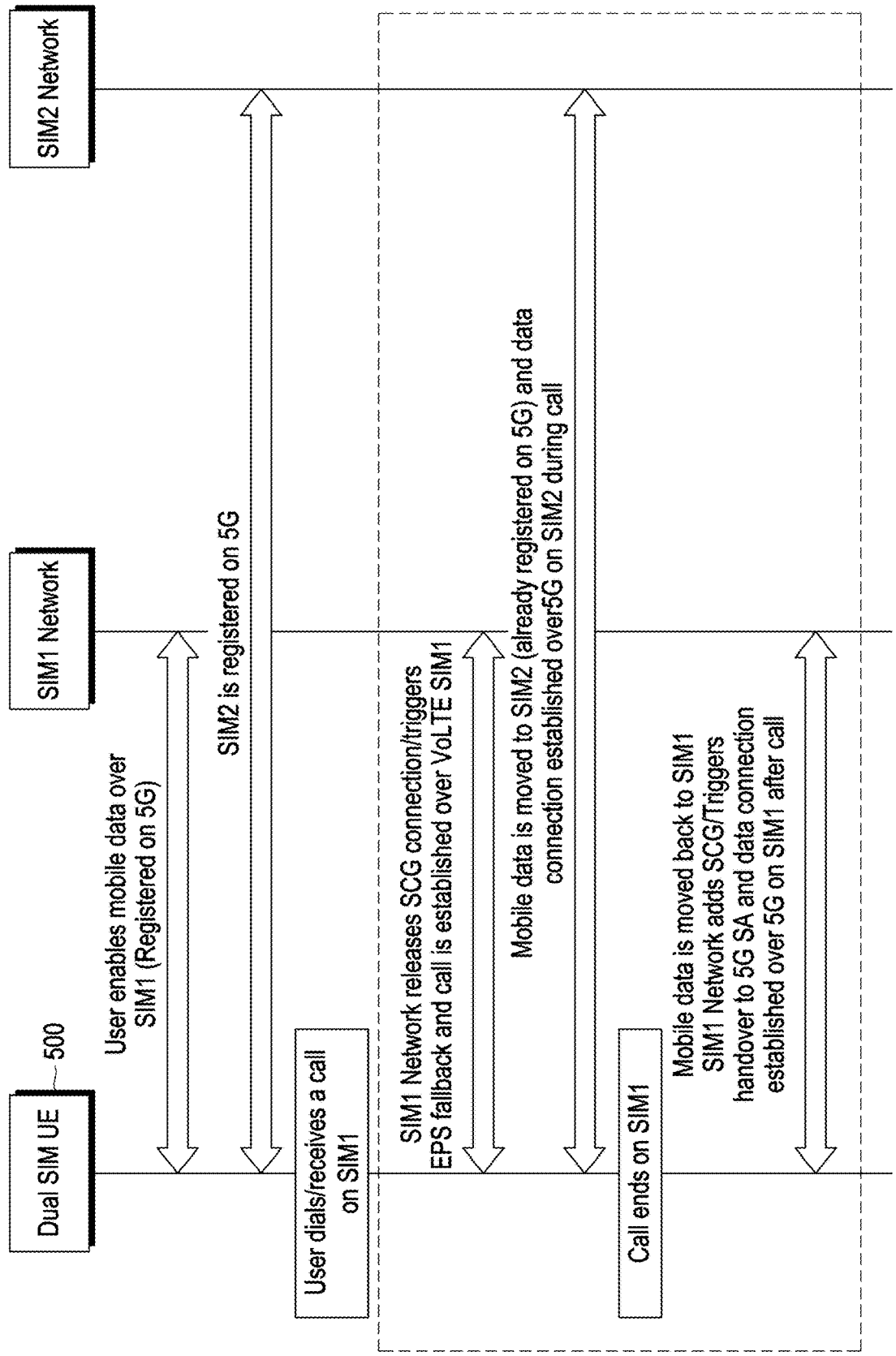
FIG. 7 is a sequence diagram depicting the reception of 5G data services during a VoLTE call, wherein 5G data services are being availed on SIM 1 of the UE (Dual SIM UE) when the VoLTE call is triggered on SIM 1, according to embodiments as disclosed herein.

FIG. 7 is a sequence diagram depicting the reception of 5G data services during a VoLTE call, wherein 5G data services are being availed on SIM 1 of the UE 500 (Dual SIM UE) when the VoLTE call is triggered on SIM 1, according to embodiments as disclosed herein. Consider that 5G feature is supported by the UE 500 simultaneously on SIM 1 and SIM 2. The Dual SIM UE 500 supports VoLTE Call and 5G data services simultaneously on SIM 1 and SIM 2. Initially, the user enables mobile data, i.e., 5G data services, on SIM 1, wherein SIM 1 is registered with the 5G network. As the Dual SIM UE supports the 5G feature simultaneously on SIM 1 and SIM 2, the SIM 2 is registered with a 5G network. It is to be noted that SIM 1 and SIM 2 may be connected to the same 5G network or connected to different 5G networks. Thereafter, the user can avail 5G data services on SIM 1.

At this instance, consider that a VoLTE call is received on SIM 1 or the user dials a number to initiate a VoLTE call on SIM 1. When the VoLTE call is received/initiated, the 5G network, to which the Dual SIM UE is connected, either releases SCG bearers (SCG bearer connection) providing 5G data services (network option 3) or triggers an Evolved Packet System (EPS) fallback (network option 2). At this instance mobile data (5G data services) is enabled on SIM 2, i.e., DDS is set to SIM 2 from SIM 1 and the 5G antenna is moved from SIM 1 to SIM 2. Thus, a 5G data connection is established over SIM 2 (as SIM 2 was registered on the 5G network). Thus, the SIM 2 would be able to provide 5G data services, when the mobile data is enabled on SIM 2. The mobile data can remain enabled on SIM 2 as long as the user is engaged in the VoLTE call on SIM 1. Once the VoLTE call is terminated, the mobile data can be enabled again on SIM 1 either by requesting the 5G network (to which the SIM 1 is connected) to add SCG bearers or requesting the 5G network to trigger a handover to the 5G network, if the 5G network is a standalone network. Further, the DDS is set to SIM 1 and the 5G antenna is moved from SIM 2 to SIM 1.

Figure 8:
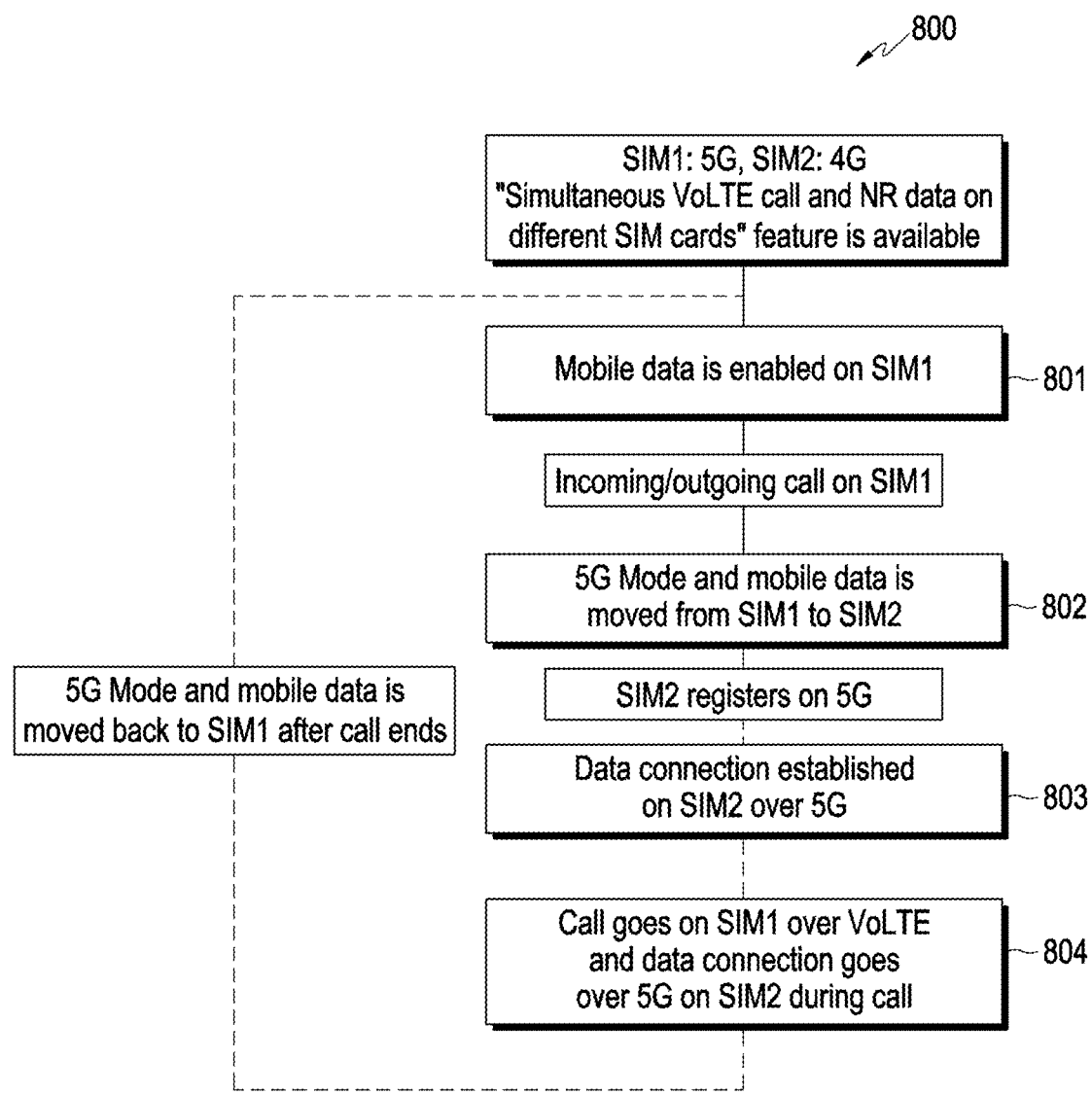
FIG. 8 is a flowchart detecting another method for providing 5G data services to the UE during a VoLTE call, wherein 5G data services are being availed on SIM 1 of the UE when the VoLTE call is triggered on SIM 1, according to embodiments as disclosed herein.

FIG. 8 is a flowchart depicting another method 800 for providing 5G data services to the UE 500 during a VoLTE call, wherein 5G data services are being availed on SIM 1 of the UE 500 when the VoLTE call is triggered on SIM 1, according to embodiments as disclosed herein. Consider that the UE 500 supports 5G on SIM 1 and 4G on SIM 2. The UE 500 is capable of supporting VoLTE calls (4G) on SIM 1 and 5G data services on SIM 2 simultaneously. At step 801, the method includes enabling mobile data, i.e., 5G data services, on SIM 1. Thereafter, the user can avail 5G data services on SIM 1. At this instance, consider that a VoLTE call (incoming or outgoing) has been triggered on SIM 1. At step 802, the method includes enabling 5G mode in SIM 2 (resulting in automatic setting of SIM 1 to 4G mode, and use of the one or more 4G antennas present in the UE 500 in an interleaved manner) and enabling mobile data, i.e., 5G data services, on SIM 2 after detecting that the VoLTE call is triggered on SIM 1. Enabling 5G mode in SIM 2 comprises setting SIM 2 as DDS and moving the 5G antenna to SIM 2 from SIM 1. Once 5G mode is enabled in SIM 2, SIM 2 can register with the 5G network.

At step 803, the method includes establishing a 5G data connection over SIM 2. As the UE 500 supports VoLTE calls on SIM 1 and 5G data services on SIM 2 simultaneously, the SIM 2 would be able to provide 5G data services after registration with the 5G network and the establishment of the 5G data connection over SIM 2. At step 804, the method includes enabling the user to avail 5G data services on SIM 2 as long as the user is engaged in the VoLTE call on SIM 1. Once the VoLTE call is terminated, 5G data can be enabled again on SIM 1 (step 801). Enabling 5G mode in SIM 1 comprises setting SIM 1 as DDS and moving the 5G antenna to SIM 1 from SIM 2.

The various actions in the method 800 may be performed in the order presented, in a different order, or simultaneously. Further, in some embodiments, some actions listed in FIG. 8 may be omitted.

Figure 9:
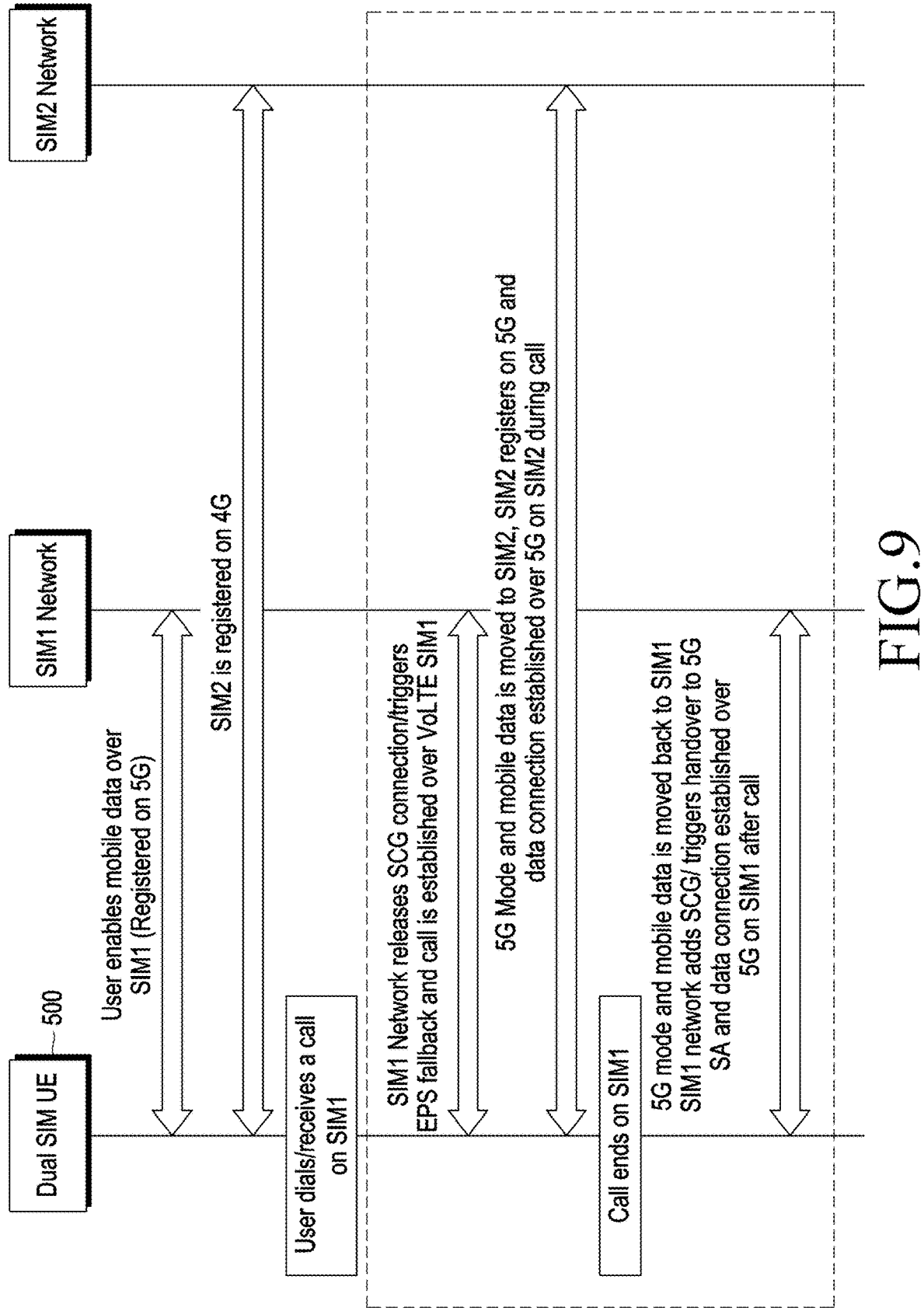
FIG. 9 is another sequence diagram depicting the reception of 5G data services during a VoLTE call, wherein 5G data services are being availed on SIM 1 of the UE (Dual SIM UE) when the VoLTE call is triggered on SIM 1, according to embodiments as disclosed herein.

FIG. 9 is another sequence diagram depicting the reception of 5G data services during a VoLTE call, wherein 5G data services are being availed on SIM 1 of the UE 500 (Dual SIM UE) when the VoLTE call is triggered on SIM 1, according to embodiments as disclosed herein. The Dual SIM UE supports 5G on SIM 1 and 4G on SIM 2. The Dual SIM UE supports VoLTE Call and 5G data services simultaneously on SIM 1 and SIM 2. Initially, the user enables mobile data, i.e., 5G data services, on SIM 1, wherein SIM 1 is registered with the 5G network. The SIM 2 is registered with a 4G network. Thereafter, the user can avail 5G data services on SIM 1. The one or more 4G antennas present in the UE 500 can be used in an interleaved manner.

At this instance, consider that a VoLTE call is received on SIM 1 or the user dials a number to initiate a VoLTE call on SIM 1. When the VoLTE call is received/initiated, the 5G network, to which the Dual SIM UE is connected, either releases SCG bearers (SCG bearer connection) providing 5G data services (network option 3) or triggers an EPS fallback (network option 2). At this instance, 5G mode is enabled on SIM 2. Enabling 5G mode in SIM 2 comprises setting SIM 2 as DDS and moving the 5G antenna to SIM 2 from SIM 1. Thereafter, the Dual SIM UE triggers registration with the 5G network on SIM 2. The user enables mobile data (5G data services) on SIM 2, i.e., DDS is set to SIM 2 from SIM 1. Thus, a 5G data connection is established over SIM 2 (as SIM 2 has registered on the 5G network). Thus, the SIM 2 would be able to provide 5G data services when the mobile data is enabled on SIM 2. The mobile data can remain enabled on SIM 2 as long as the user is engaged in the VoLTE call on SIM 1. Once the VoLTE call is terminated, the mobile data can be enabled again on SIM 1 either by requesting the 5G network (to which the SIM 1 is connected) to add SCG bearers or requesting the 5G network to trigger a handover to the 5G network, if the 5G network is a standalone network. Enabling 5G mode in SIM 1 comprises setting SIM 1 as DDS and moving the 5G antenna to SIM 1 from SIM 2.

Figure 10:
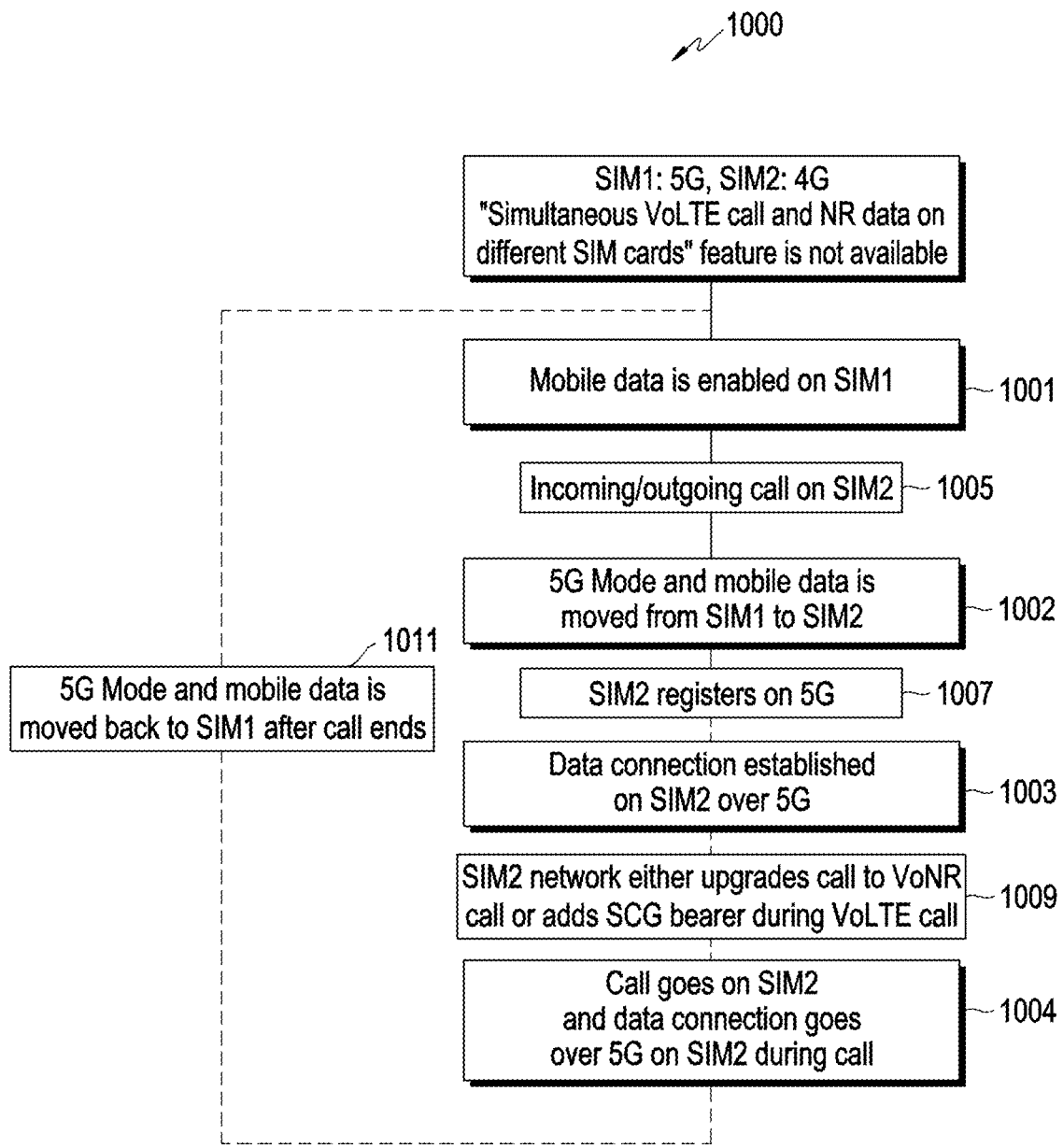
FIG. 10 is a flowchart detecting a method for providing 5G data services to the UE during a VoLTE call, wherein 5G data services are being availed on SIM 1 of the UE when the VoLTE call is triggered on SIM 2, according to embodiments as disclosed herein.

FIG. 10 is a flowchart depicting a method 1000 for providing 5G data services to the UE 500 during a VoLTE call, wherein 5G data services are being availed on SIM 1 of the UE 500 when the VoLTE call is triggered on SIM 2, according to embodiments as disclosed herein. Consider that the UE 500 supports 5G on SIM 1 and 4G on SIM 2. The UE 500 is connected to a 5G network on SIM 1 and a 4G network on SIM 2. The UE 500 can receive VoLTE calls and 5G data services simultaneously on either of SIM 1 or SIM 2. At step 1001, the method includes enabling mobile data, i.e., 5G data services, on SIM 1. Thereafter, the user can avail 5G data services on SIM 1. At this instance, consider that at step 1005 a VoLTE call (incoming or outgoing) has been triggered on SIM 2. At step 1002, the method includes enabling 5G mode in SIM 2 and enabling mobile data, i.e., 5G data services, on SIM 2 (after detecting that the VoLTE call is triggered on SIM 2). Enabling 5G data services in SIM 2 comprises setting SIM 2 as DDS and moving the 5G antenna to SIM 2 from SIM 1. Once 5G mode is enabled in SIM 2, SIM 2 can register (at step 1007) with the 5G network.

At step 1003, the method includes establishing a 5G data connection over SIM 2. The SIM 2 would be able to provide 5G data services after registration with the 5G network and the establishment of the 5G data connection over SIM 2. At block 1009, the 5G data services can be provided either by adding SCG bearers on SIM 2, while the user is engaged in the VoLTE call on SIM 2 (network option 3); or, if the 5G network is a 5G standalone network, the 5G data services can be provided by the 5G standalone network while the VoLTE call (triggered on SIM 2) can be converted to a VoNR call, if the 5G standalone network supports VoNR calls. At step 1004, the method includes enabling the user to avail 5G data services on SIM 2 as long as the user is engaged in the VoLTE call/VoNR Call on SIM 2. Once the VoLTE/VoNR call is terminated, the mobile data can be enabled again on SIM 1 (step 1001). At step 1011, enabling 5G mode again in SIM 1 comprises setting SIM 1 as DDS and moving the 5G antenna to SIM 1 from SIM 2.

The various actions in the method 1000 may be performed in the order presented, in a different order, or simultaneously. Further, in some embodiments, some actions listed in FIG. 10 may be omitted.

Figure 11:
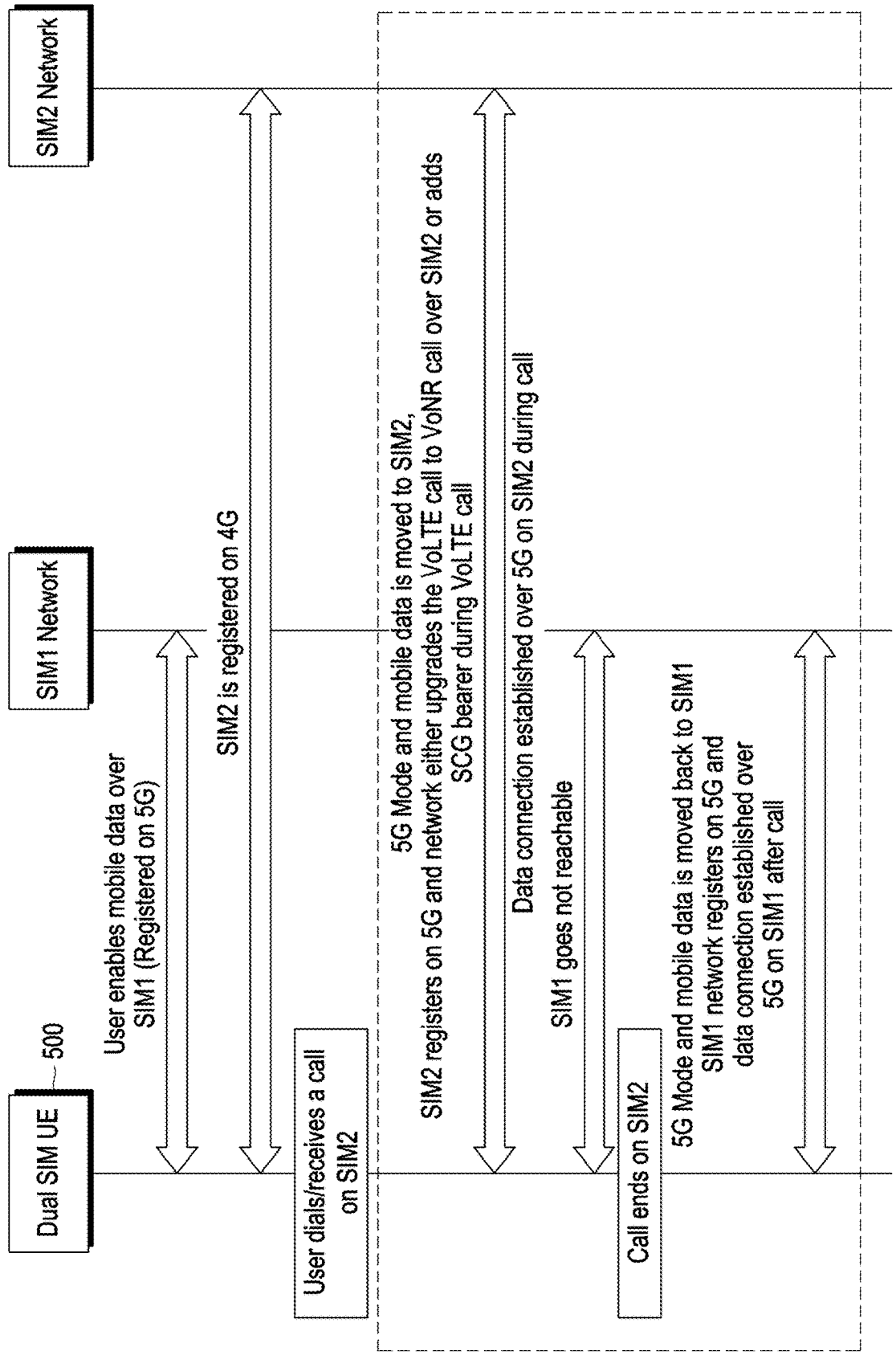
FIG. 11 is a sequence diagram depicting the reception of 5G data services during a VoLTE call, wherein 5G data services are being availed on SIM 1 of the UE (Dual SIM UE) when the VoLTE call is triggered on SIM 2, according to embodiments as disclosed herein.

FIG. 11 is a sequence diagram depicting the reception of 5G data services during a VoLTE call, wherein 5G data services are being availed on SIM 1 of the UE 500 (Dual SIM UE) when the VoLTE call is triggered on SIM 2, according to embodiments as disclosed herein. The Dual SIM UE supports 5G on SIM 1 and 4G on SIM 2. The Dual SIM UE is connected to a 5G network on SIM 1 and a 4G network on SIM 2. The Dual SIM UE can receive VoLTE calls and 5G data services simultaneously on either of SIM 1 or SIM 2. Initially, the user enables mobile data, i.e., 5G data services, on SIM 1, wherein SIM 1 is registered with the 5G network. Thereafter, the user can avail 5G data services on SIM 1. The SIM 2 is registered with a 4G network.

At this instance, consider that a VoLTE call is received on SIM 2 or the user dials a number to initiate a VoLTE call on SIM 2. When the VoLTE call is received/initiated on SIM 2, the SIM 1 loses its connection with the 5G network, to which was connected (SIM 1 goes "Not reachable"). At this instance, 5G mode is enabled on SIM 2. Thereafter, the UE 500 triggers registration with the 5G network on SIM 2. The user enables mobile data (5G data services) on SIM 2, i.e., DDS is set to SIM 2 from SIM 1 and the 5G antenna is moved to SIM 2. Thus, a 5G data connection is established over SIM 2 (as SIM 2 has registered with the 5G network). Thus, the SIM 2 would be able to provide 5G data services, when the mobile data is enabled on SIM 2. The 5G data services can be provided either by adding SCG bearers on SIM 2, while the user is engaged in the VoLTE call on SIM 2 (network option 3); or, if the 5G network is a 5G standalone network, the 5G data services can be provided by the 5G standalone network while the VoLTE call (triggered on SIM 2) can be converted to a VoNR call, if the 5G standalone network supports VoNR calls. This comprises of the UE providing information to the 5G network about 5G capabilities of the SIM 2, the 5G network determining that the VoLTE call can be converted to the VoNR call (based on the provided information) and provides an indication to the UE 500 to switch the VoLTE call to VoNR call. In an embodiment herein, the UE provides information to the 5G network about 5G capabilities of the SIM 2 using any suitable information element/communication element. The mobile data can remain enabled on SIM 2, as long as the user is engaged in the VoLTE/VoNR call on SIM 2. Once the VoLTE/VoNR call is terminated, the mobile data can be enabled again on SIM 1 either by requesting the 5G network (to which the SIM 1 is connected) to add SCG bearers or requesting the 5G network to trigger a handover to the 5G network, if the 5G network is a standalone network.

Figure 12:
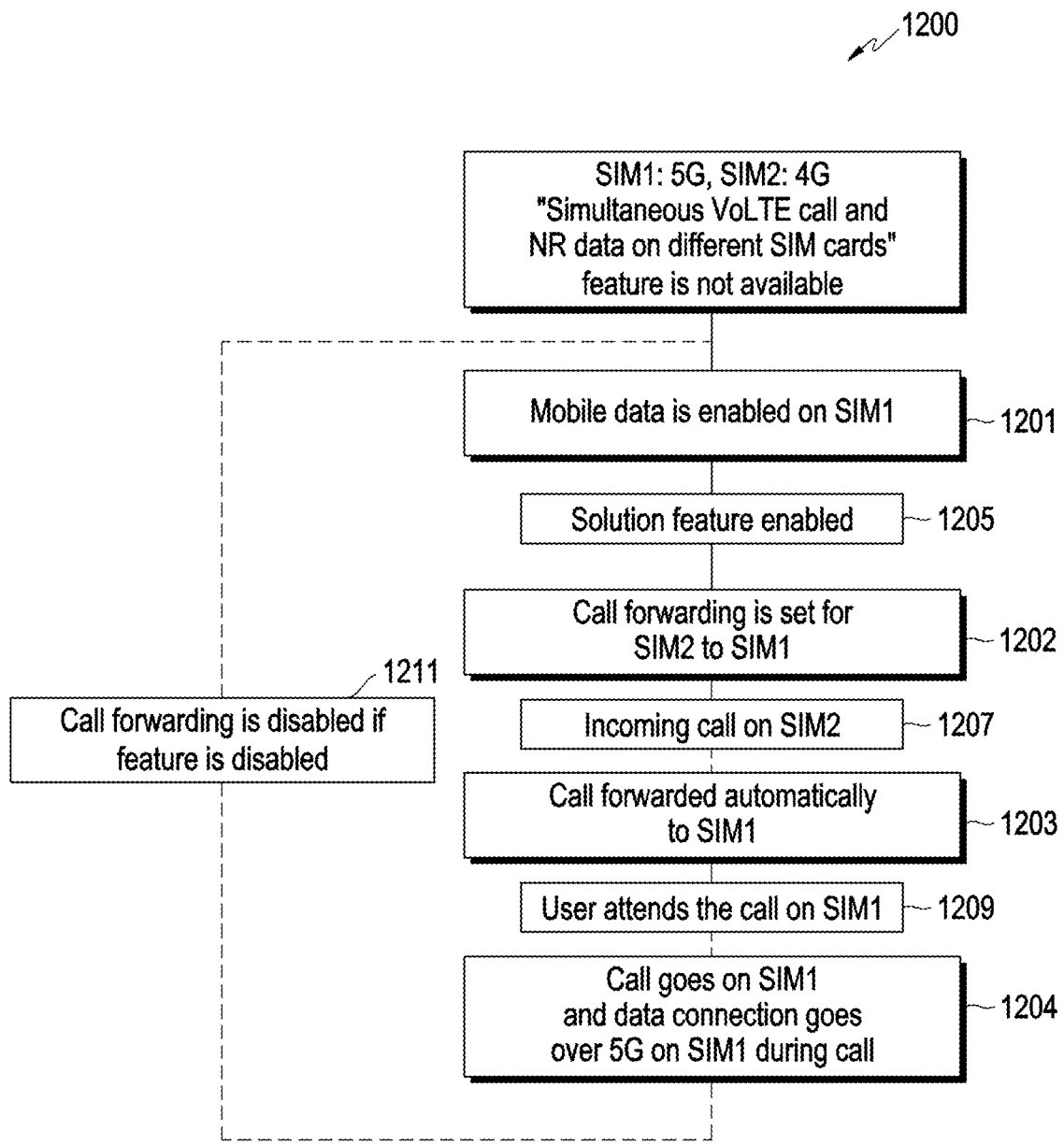
FIG. 12 is a flowchart detecting a method for providing 5G data services to the UE during a VoLTE call, wherein 5G data services are being availed on SIM 1 of the UE when the VoLTE call is received on SIM 2, according to embodiments as disclosed herein.

FIG. 12 is a flowchart depicting a method 1200 for providing 5G data services to the UE 500 during a VoLTE call, wherein 5G data services are being availed on SIM 1 of the UE 500 when the VoLTE call is received on SIM 2, according to embodiments as disclosed herein. Consider that the UE 500 supports 5G on SIM 1 and 4G on SIM 2. The UE 500 is connected to a 5G network on SIM 1 and a 4G network on SIM 2. The UE 500 can receive VoLTE calls and 5G data services simultaneously on either of SIM 1 or SIM 2. At step 1201, the method includes enabling mobile data (i.e., 5G data services on SIM 1). Thereafter, the user can avail 5G data services on SIM 1. Consider that a solution feature is enabled at step 1205. Call forwarding is disabled if the solution feature is disabled at block 1211. At step 1202, the method includes enabling a VoLTE call forwarding feature, wherein enabling the VoLTE call forwarding feature will cause incoming calls on SIM 2 to be forwarded to SIM 1, as long as the user is availing 5G data services on SIM 1.

At this instance, consider that an incoming VoLTE call is triggered on SIM 2 at step 1207. At step 1203, the method includes forwarding the incoming call on SIM 2 to SIM 1 automatically. At step 1204, the method includes, enabling the user to attend (at step 1209) the incoming call on SIM 1, while availing 5G data services on SIM 1.

The various actions in the method 1200 may be performed in the order presented, in a different order, or simultaneously. Further, in some embodiments, some actions listed in FIG. 12 may be omitted.

Figure 13:
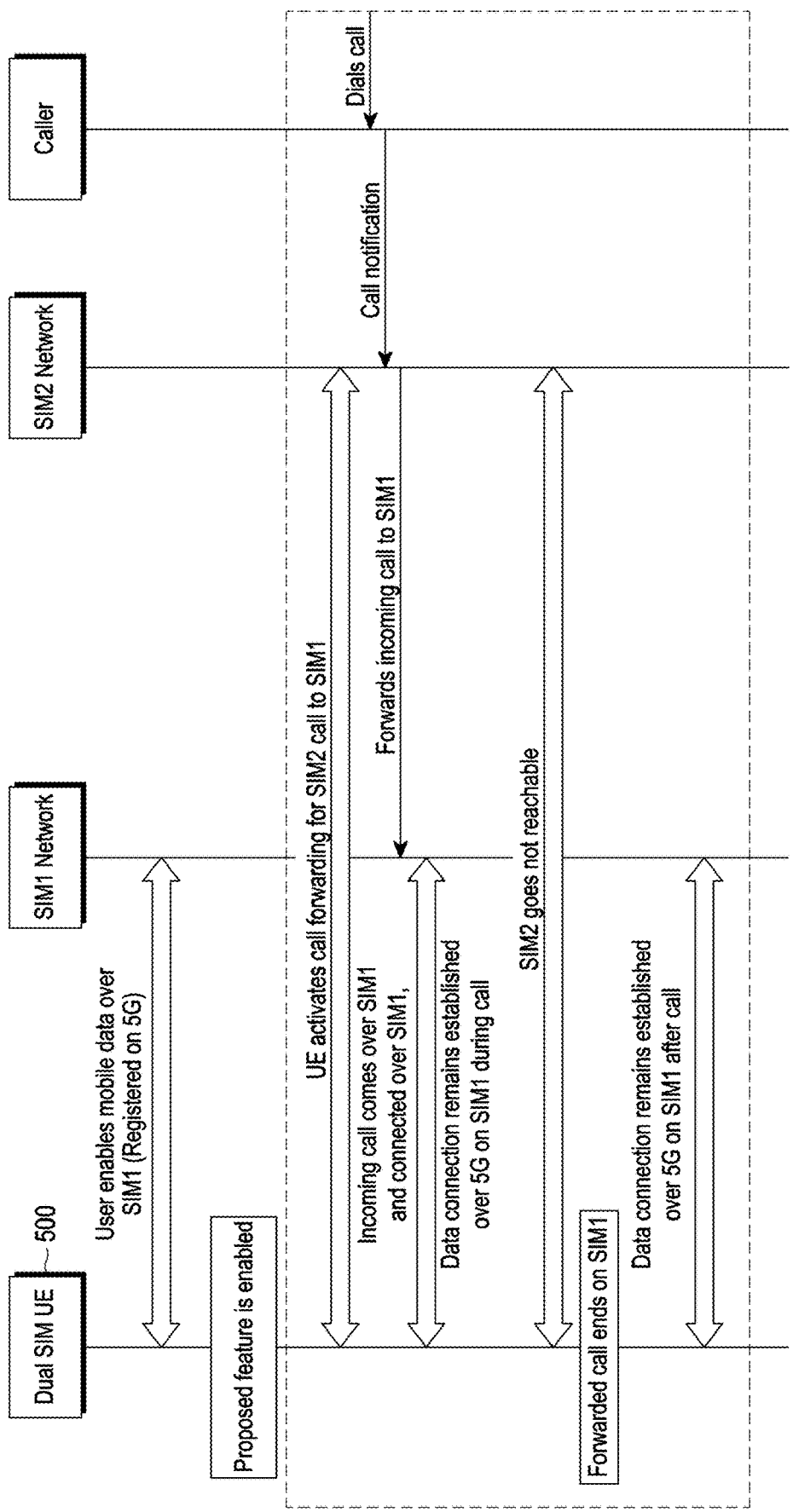
FIG. 13 is a sequence diagram depicting the reception of 5G data services during a VoLTE call, wherein 5G data services are being availed on SIM 1 of the UE (Dual SIM UE) when the VoLTE call is received on SIM 2, according to embodiments as disclosed herein.

FIG. 13 is a sequence diagram depicting the reception of 5G data services during a VoLTE call, wherein 5G data services are being availed on SIM 1 of the UE 500 (Dual SIM UE) when the VoLTE call is received on SIM 2, according to embodiments as disclosed herein. The Dual SIM UE supports 5G on SIM 1 and 4G on SIM 2. The Dual SIM UE is connected to a 5G network on SIM 1 and a 4G network on SIM 2. The Dual SIM UE can receive VoLTE calls and 5G data services simultaneously on either of SIM 1 or SIM 2. Initially, the user enables mobile data, i.e., 5G data services, on SIM 1, wherein SIM 1 is registered with the 5G network. Thereafter, the user can avail 5G data services on SIM 1. The Dual SIM UE can activate the VoLTE call forwarding feature, wherein activation of the VoLTE call forwarding feature causes incoming calls on SIM 2 to be forwarded to SIM 1 as long as the user is availing 5G data services on SIM 1.

At this instance, consider that a caller dials a VoLTE call to be received on a number associated with SIM 2. The 4G network, to which SIM 2 is connected, can receive a VoLTE call notification. On receiving the VoLTE call notification, the 4G network forwards the incoming VoLTE call to the 5G network, to which SIM 1 is connected. As a result, the incoming VoLTE call is received on SIM 1. The user continues to avail 5G data services on SIM 1 while attending the VoLTE/VoNR call on SIM 1. When the VoLTE/VoNR call is received on SIM 1, the SIM 2 loses its connection with the 4G network, to which was connected (SIM 2 goes "Not reachable"). The 5G data services continue on SIM 1 after the termination of the forwarded VoLTE call on SIM 1.

Figure 14:
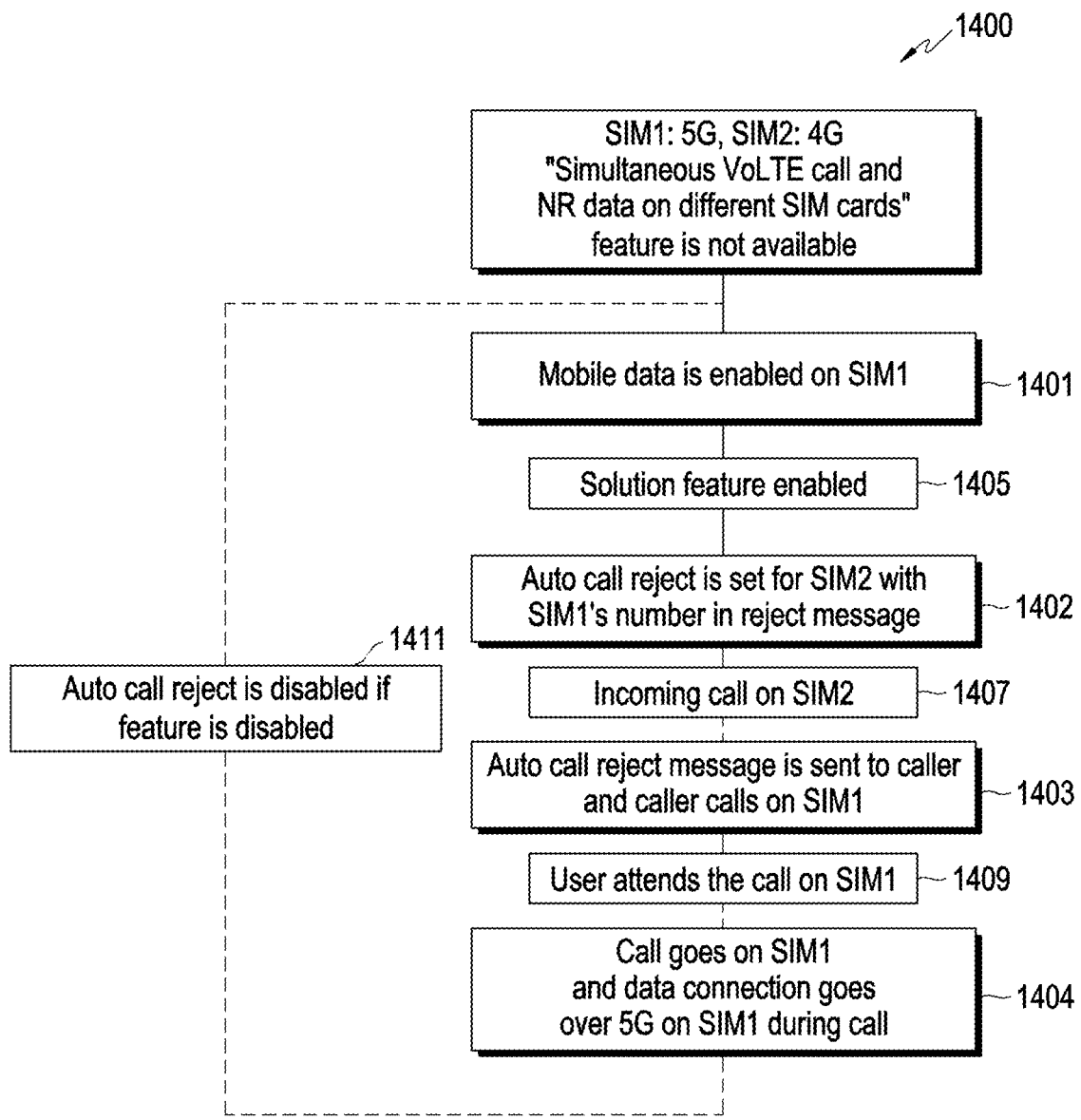
FIG. 14 is a flowchart detecting another method for providing 5G data services to the UE during a VoLTE call, wherein 5G data services are being availed on SIM 1 of the UE when the VoLTE call is received on SIM 2, according to embodiments as disclosed herein.

FIG. 14 is a flowchart depicting another method 1400 for providing 5G data services to the UE 500 during a VoLTE call, wherein 5G data services are being availed on SIM 1 of the UE 500 when the VoLTE call is received on SIM 2, according to embodiments as disclosed herein. Consider that the UE 500 supports 5G on SIM 1 and 4G on SIM 2. The UE 500 is connected to a 5G network on SIM 1 and a 4G network on SIM 2. The UE 500 can receive VoLTE calls and 5G data services simultaneously on either of SIM 1 or SIM 2. At step 1401, the method includes enabling mobile data, i.e., 5G data services, on SIM 1. Thereafter, the user can avail 5G data services on SIM 1.

Consider that a solution feature is enabled at step 1405. Auto call rejection is disabled if the solution feature is disabled at block 1411. At step 1402, the method includes enabling an auto VoLTE call reject feature, wherein enabling the auto VoLTE call reject feature will cause incoming calls on SIM 2 to be rejected as long as the user is availing 5G data services on SIM 1 and cause the UE 500 to send a message that includes the number associated with SIM 1 using SIM 2. At this instance, at step 1407, consider that an incoming VoLTE call is triggered on SIM 2. At step 1403, the method includes rejecting the incoming call on SIM 2. A message indicating the number associated with SIM 1 is sent to the VoLTE caller, which message includes the phone number associated with SIM 1, so the caller is likely to dial the VoLTE/VoNR call on the phone number associated with SIM 1. At step 1404, the method allows the user to attend (at step 1409) the incoming call on SIM 1, while availing 5G data services on SIM 1.

The various actions in the method 1400 may be performed in the order presented, in a different order, or simultaneously. Further, in some embodiments, some actions listed in FIG. 14 may be omitted.

Figure 15:
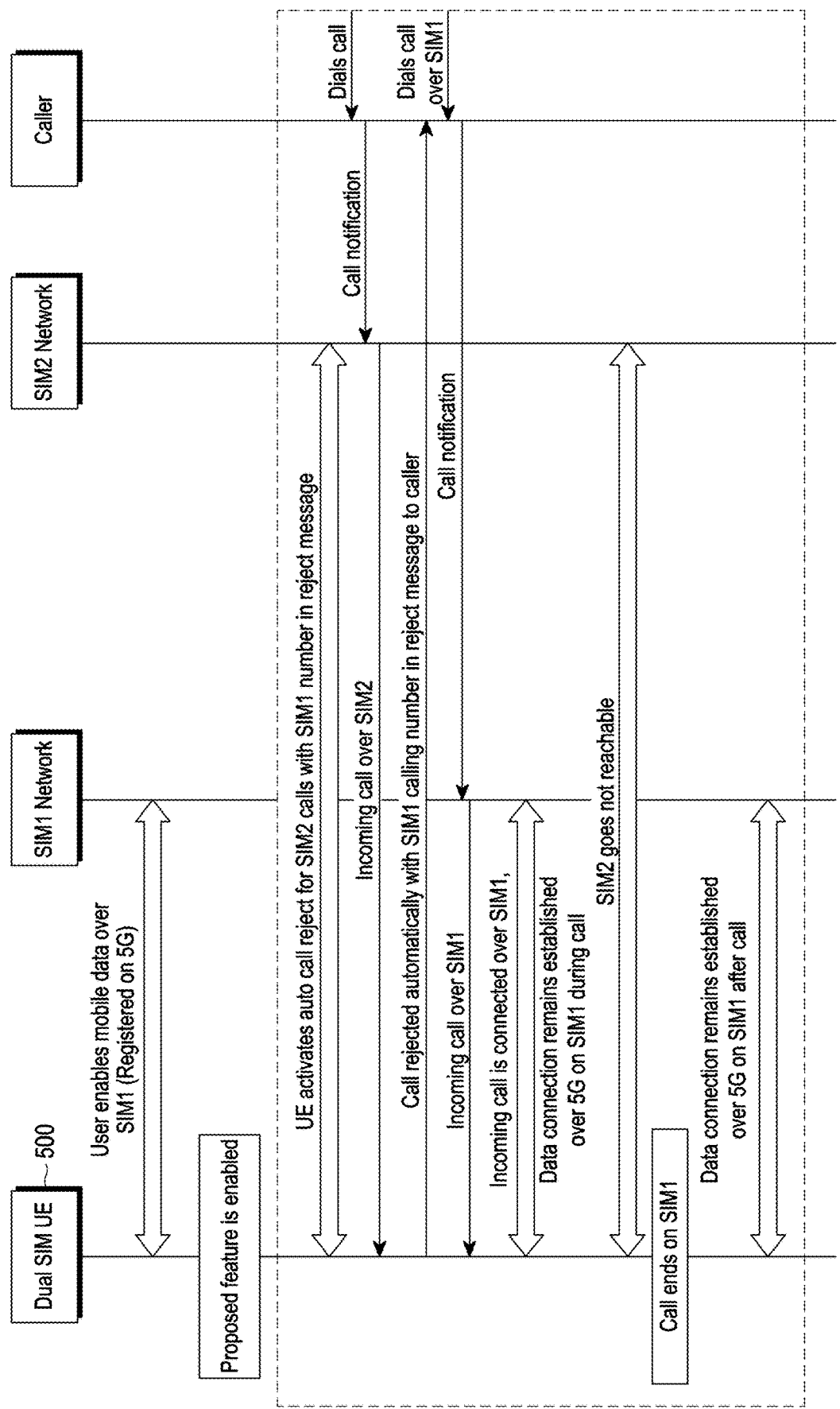
FIG. 15 is another sequence diagram depicting the reception of 5G data services during a VoLTE call, wherein 5G data services are being availed on SIM 1 of the UE (Dual SIM UE) when the VoLTE call is received on SIM 2, according to embodiments as disclosed herein.

FIG. 15 is another sequence diagram depicting the reception of 5G data services during a VoLTE call, wherein 5G data services are being availed on SIM 1 of the UE 500 (Dual SIM UE) when the VoLTE call is received on SIM 2, according to embodiments as disclosed herein. The Dual SIM UE supports 5G on SIM 1 and 4G on SIM 2. The Dual SIM UE is connected to a 5G network on SIM 1 and a 4G network on SIM 2. The Dual SIM UE can receive VoLTE calls and 5G data services simultaneously on either of SIM 1 or SIM 2. Initially, the user enables mobile data, i.e., 5G data services, on SIM 1, wherein SIM 1 is registered with the 5G network. Thereafter, the user can avail 5G data services on SIM 1. The Dual SIM UE can activate the auto VoLTE call reject feature, wherein activation of the auto VoLTE call reject feature will cause incoming VoLTE calls on SIM 2 to be rejected as long as the user is availing 5G data services on SIM 1. The activation of the auto VoLTE call reject feature will also cause the Dual SIM UE to send a message that includes the number associated with SIM 1.

At this instance, consider that a VoLTE caller dials a VoLTE call to be received on a number associated with SIM 2. The 4G network, to which SIM 2 is connected, can receive a VoLTE call notification. On receiving the VoLTE call notification, the 4G network notifies the Dual SIM UE about the incoming VoLTE call. As a result, the incoming VoLTE call is received on SIM 2. The Dual SIM UE can reject the incoming VoLTE call and send a message to the VoLTE caller, indicating the number associated with SIM 1, using SIM 2, to the VoLTE caller.

Consider that the VoLTE caller dials a VoLTE call to be received on a number associated with SIM 1. The 5G network, to which SIM 1 is connected, can receive a VoLTE/VoNR call notification. On receiving the VoLTE/

VoNR call notification, the 5G network informs the user about the incoming VoLTE/VoNR call on SIM 1. The incoming VoLTE/VoNR call is received by the user on SIM 1. The user continues to avail 5G data services on SIM 1 while attending the VoLTE/VoNR call on SIM 1. When the VoLTE/VoNR call is received on SIM 1, the SIM 2 loses its connection with the 4G network, to which was connected (SIM 2 goes "Not reachable"). The 5G data services continue on SIM 1 after the termination of the received incoming VoLTE/VoNR call on SIM 1.

Figure 16:
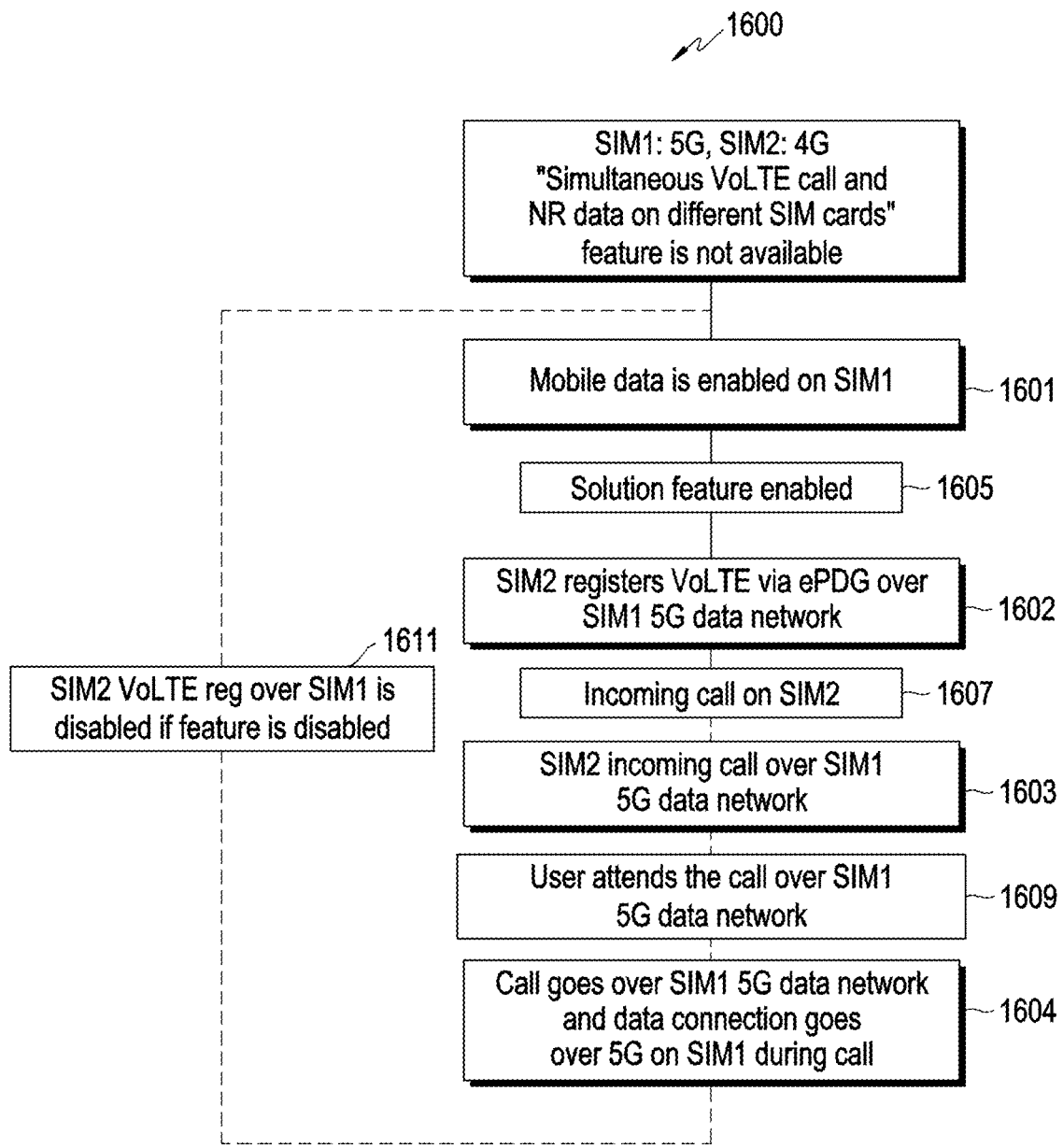
FIG. 16 is a flowchart detecting yet another method for providing 5G data services to the UE during a VoLTE call, wherein 5G data services are being availed on SIM 1 of the UE when the VoLTE call is received on SIM 2, according to embodiments as disclosed herein.

FIG. 16 is a flowchart detecting yet another method 1600 for providing 5G data services to the UE 500 during a VoLTE call, wherein 5G data services are being availed on SIM 1 of the UE 500 when the VoLTE call is received on SIM 2, according to embodiments as disclosed herein. Consider that the UE 500 supports 5G on SIM 1 and 4G on SIM 2. The UE 500 is connected to a 5G network on SIM 1 and a 4G network on SIM 2. The UE 500 can receive VoLTE calls and 5G data services simultaneously on either of SIM 1 or SIM 2. At step 1601, the method includes enabling mobile data, i.e., 5G data services, on SIM 1. Thereafter, the user can avail 5G data services on SIM 1.

Consider that a solution feature is enabled at step 1605. SIM 2 VoLTE registration over SIM 1 is disabled if the solution feature is disabled at step 1611. At step 1602, the method includes triggering a SIM 2 IMS registration with N3IWF using SIM 1. Thus, the SIM 2 IMS registration with the N3IWF takes place with the 5G network to which the SIM 1 is connected. At this instance, at step 1607, consider that an incoming VoLTE call is triggered on SIM 2. At step 1603, the method includes receiving the incoming call on SIM 1, as SIM 2 IMS registration with the N3IWF using SIM 1 has taken place. Thus, the user can attend the incoming VoLTE/VoNR call. At step 1604, the method includes, enabling the user to attend (at step 1609) the incoming call on SIM 1 while availing 5G data services on SIM 1. If the user stops availing 5G data services on SIM 1, the SIM 2 IMS registration with the N3IWF on SIM 1 can be disabled.

The various actions in the method 1600 may be performed in the order presented, in a different order, or simultaneously. Further, in some embodiments, some actions listed in FIG. 16 may be omitted.

Figure 17:
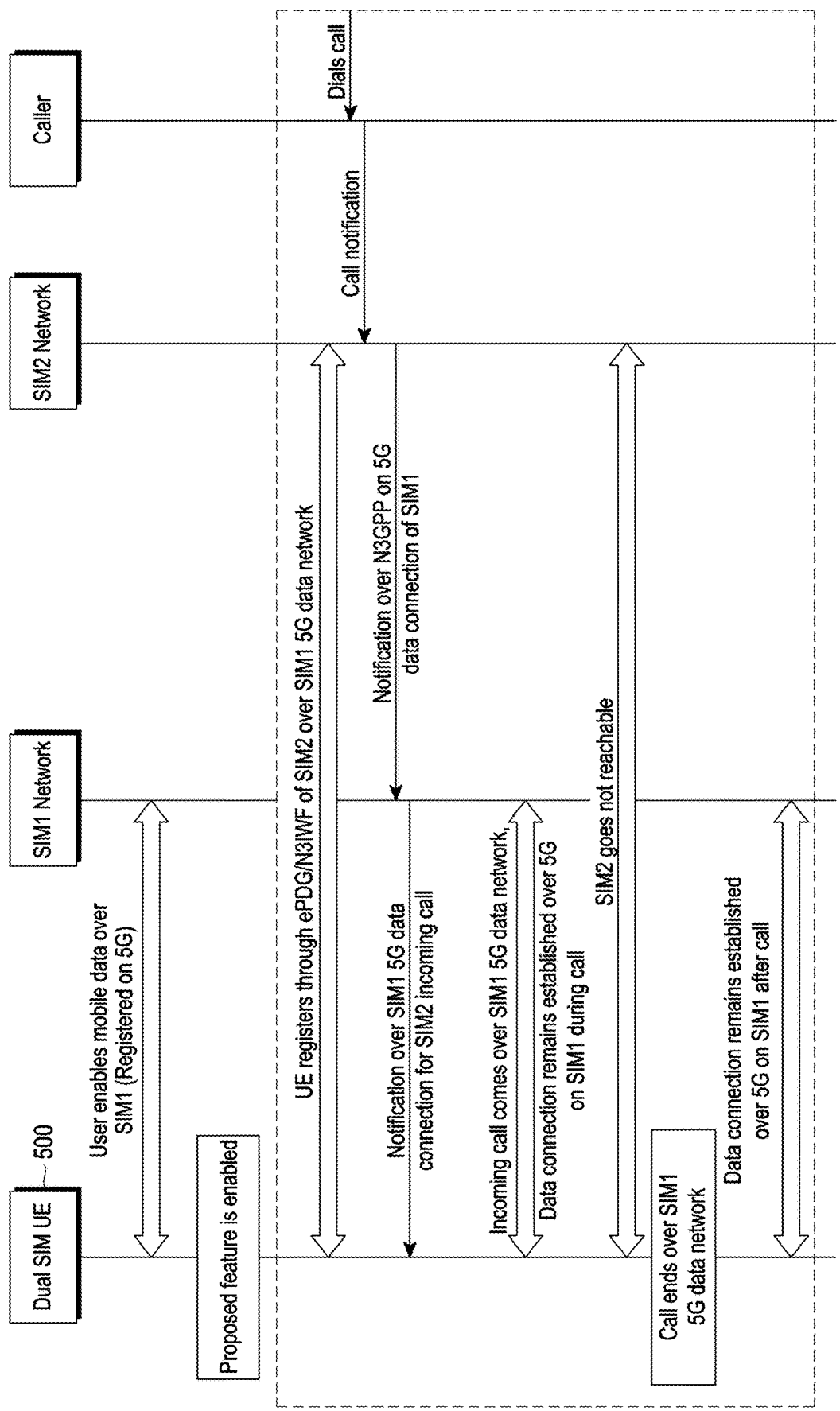
FIG. 17 is yet another sequence diagram depicting the reception of 5G data services during a VoLTE call, wherein 5G data services are being availed on SIM 1 of the UE (Dual SIM UE) when the VoLTE call is received on SIM 2, according to embodiments as disclosed herein.

FIG. 17 is yet another sequence diagram depicting the reception of 5G data services during a VoLTE call, wherein 5G data services are being availed on SIM 1 of the UE 500 (Dual SIM UE) when the VoLTE call is received on SIM 2, according to embodiments as disclosed herein. The Dual SIM UE supports 5G on SIM 1 and 4G on SIM 2. The Dual SIM UE is connected to a 5G network on SIM 1 and a 4G network on SIM 2. The Dual SIM UE can receive VoLTE calls and 5G data services simultaneously on either of SIM 1 or SIM 2. Initially, the user enables mobile data, i.e., 5G data services, on SIM 1, wherein SIM 1 is registered with the 5G network. Thereafter, the user can avail 5G data services on SIM 1. Once the user starts availing 5G data services using SIM 1, the Dual SIM UE can register, through an Evolved Packet Data Gateway (ePDG) or a Non-3$^{rd}$ generation partnership project Interworking Function (N3IWF) of SIM 2, with the 5G network to which SIM 1 is connected.

At this instance, consider that a VoLTE caller dials a VoLTE call to be received on a number associated with SIM 2. The 4G network, to which SIM 2 is connected, can receive a VoLTE call notification. On receiving the VoLTE call notification, the 4G network notifies the Dual SIM UE about the incoming VoLTE call through the 5G network on SIM 1. The 4G network (to which SIM 2 is connected) notifies the 5G network (to which SIM 1 is connected) about the incoming VoLTE call. The 5G network notifies the Dual SIM UE about the incoming VoLTE call, which results in the incoming VoLTE call being received on SIM 1. The user continues to avail 5G data services on SIM 1 while attending the VoLTE/VoNR call on SIM 1. When the VoLTE call is received on SIM 1, the SIM 2 loses its connection with the 4G network, to which was connected (SIM 2 goes "Not reachable"). The 5G data services continue on SIM 1 after the termination of the received incoming VoLTE/VoNR call on SIM 1.

Figure 18:
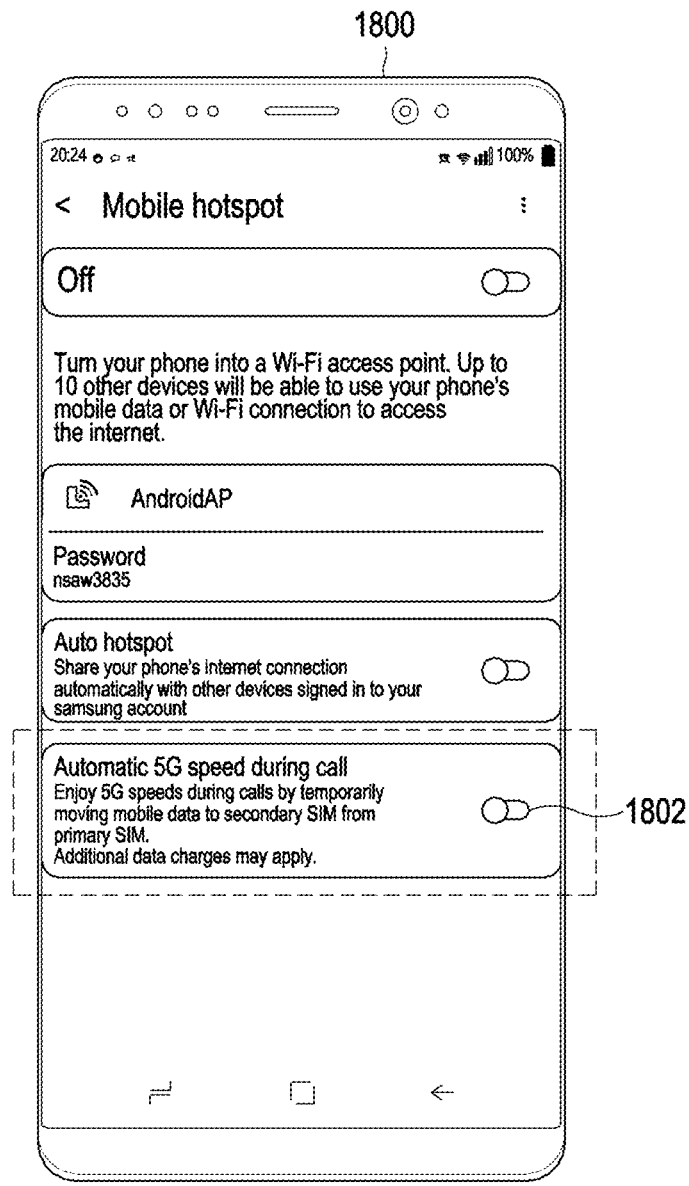
FIG. 18 depicts a User Interface (UI) that enables a user to avail 5G data services and VoLTE calls simultaneously on different SIM cards of the UE, according to embodiments as disclosed herein.

FIG. 18 depicts a User Interface (UI) 1800 that enables a user to avail 5G data services and VoLTE calls simultaneously on different SIM cards of the UE 500, according to embodiments as disclosed herein. As depicted in FIG. 18, the UI provides an option 1802 to the user to enable automatic setting of DDS (Mobile Data) from a first SIM to a second SIM, when a VoLTE call is triggered on the first SIM while availing 5G data services through the first SIM. If the user enables the option, then the user can avail 5G data services on the second SIM while engaging on the VoLTE call on the first SIM. If the UE 500 supports 5G simultaneously on the first SIM and the second SIM, then a 5G data connection can be established immediately after the DDS is set to the second SIM. On the other hand, if the UE 500 supports 4G on one SIM and 5G on the other, then enabling the option results in triggering a registration with a 5G network on the second SIM after the DDS is set to the second SIM (due to the triggering of the VoLTE call in the first SIM which is on 4G).

Figure 19:
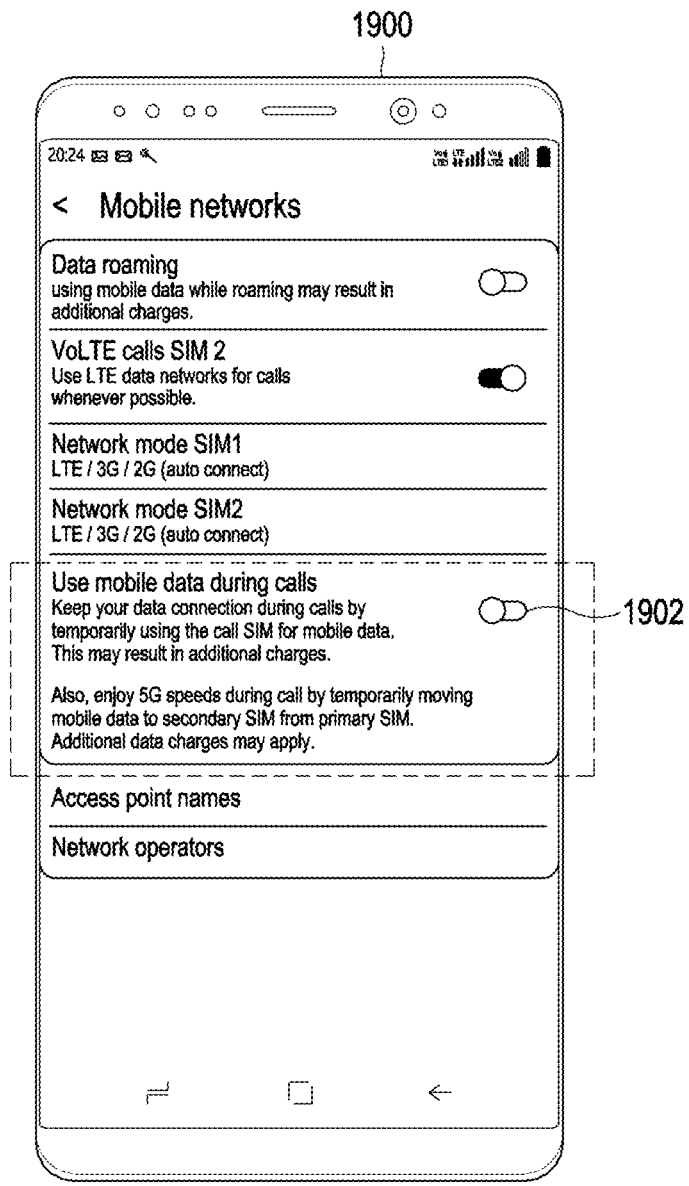
FIG. 19 depicts a UI that enables a user to avail 5G data services and VoLTE calls simultaneously on a SIM card of the UE, according to embodiments as disclosed herein.

FIG. 19 depicts a UI 1900 that enables a user to avail 5G data services and VoLTE calls simultaneously on a SIM card of the UE 500, according to embodiments as disclosed herein. As depicted in FIG. 19, the UI provides an option 1902 to the user to enable automatic setting of DDS (Mobile Data) from a first SIM to a second SIM, when a VoLTE call is triggered on the second SIM while availing 5G data services through the first SIM. The first SIM is in 5G mode and 5G data services are being availed through the first SIM. A VoLTE call is triggered on the second SIM, which is in 4G mode. If the option is enabled, the user can avail 5G data services on the second SIM while engaging on the VoLTE/VoNR call on the second SIM. This is because, when the VoLTE/VoNR call in triggered on the second SIM, the UE 500 can trigger a registration with a 5G network on the second SIM (after the DDS is set to the second SIM from the first SIM).

The embodiments enhance 5G data user experience by providing 5G data speeds during VoLTE call. The UE 500 allows availing differentiated user service for Mobile Hotspot, Tethering, Gaming, and so on, during engagement in VoLTE calls. The embodiments allow users to avail 5G services seamlessly while travelling. The embodiments allow users to avail 5G services seamlessly in different environments when multiple devices are connected to a hotspot, to which the UE 500 is connected. The embodiments allow users to avail uninterrupted gaming experience. The embodiments can be utilized for providing 5G data services during VoLTE calls, while ensuring the roadmap for 5G chipset evolution and operators' 5G network deployment.

The embodiments disclosed herein can be implemented through at least one software program running on at least one hardware device and performing network management functions to control the network elements. The network elements shown in FIG. 5 include blocks which can be at least one of a hardware device, or a combination of hardware device and software module.

The embodiments disclosed herein describe methods and systems for providing 5G data services to a user when the user is engaged in a voice call. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g., using a plurality of Central Processing Units (CPUs).

According to various embodiments, a method for providing $5^{th}$ Generation (5G) data services during a voice call in a Dual Subscriber Identity Module (SIM) User Equipment (UE) 500 may be provided, and the method may comprise determining, by the UE, initiation of a voice call on a first SIM, while availing 5G data services through the first SIM, wherein the initiation of the voice call leads to a fallback from 5G Radio Access Technology (RAT), wherein Default Data Subscription/Service (DDS) is set to the first SIM, registering, by the UE, with a 5G network through a second SIM, if the second SIM is registered with a wireless network, and availing, by the UE, the 5G data services from the second SIM, while engaging in the voice call on the first SIM.

According to various embodiments, availing, by the UE, the 5G data services from the second SIM may comprise setting a 5G mode to the second SIM, if the second SIM had not been set to 5G mode, switching the DDS from the first SIM to the second SIM, and moving a 5G antenna present in the UE 500 from the first SIM to the second SIM.

According to various embodiments, setting the 5G mode to the second SIM and switching the DDS from the first SIM to the second SIM may be automatically triggered by the UE.

According to various embodiments, the 5G mode may be set to the second SIM and the DDS is switched from the first SIM to the second SIM manually.

According to various embodiments, moving the 5G antenna present in the UE 500 from the first SIM to the second SIM may be automatically triggered by the UE.

According to various embodiments, the 5G antenna present in the UE 500 may be moved manually from the first SIM to the second SIM.

According to various embodiments, the UE 500 may support simultaneous reception of Voice over Long Term Evolution (VoLTE) calls and 5G data services through the first SIM and the second SIM.

According to various embodiments, a method for providing $5^{th}$ Generation (5G) data services during a voice call in a Dual Subscriber Identity Module (SIM) User Equipment (UE) 500 may be provided, and the method may comprise determining, by the UE 500, initiation of a voice call on a first SIM, while availing 5G data services a second SIM, wherein Default Data Subscription/Service (DDS) is set to the second SIM, triggering, by the UE 500, a registration with a 5G network through the first SIM, and performing one of: requesting, by the UE 500, to the 5G network to convert the voice call to a Voice over New Radio (VoNR) call for availing voice call services while availing the 5G data services through the first SIM; or requesting, by the UE 500, to the 5G network to add a Secondary Cell Group (SCG) bearer over the first SIM for availing the 5G data services through the first SIM, while engaging in the voice call.

According to various embodiments, triggering, by the UE 500, a registration with a 5G network through the first SIM may comprise setting the 5G mode to the first SIM, if the first SIM had not been set to 5G mode, switching the DDS from the second SIM to the first SIM, and moving a 5G antenna present in the UE 500 from the second SIM to the first SIM.

According to various embodiments, setting the 5G mode to the first SIM and switching the DDS from the second SIM to the first SIM may be automatically triggered by the UE.

According to various embodiments, setting the 5G mode to the first SIM and the DDS may be switched from the second SIM to the first SIM manually.

According to various embodiments, moving the 5G antenna present in the UE 500 from the second SIM to the first SIM may be automatically triggered by the UE.

According to various embodiments, the 5G antenna present in the UE 500 may be moved manually from the second SIM to the first SIM.

According to various embodiments, converting the voice call to a Voice over New Radio (VoNR) call for availing voice call services may comprises communicating, by the UE 500, to the 5G network about 5G capability of the first SIM, and providing, by the 5G network, an indication to the UE 500 to switch the voice call to VoNR call, on the 5G network determining that the voice call can be converted to the VoNR call.

According to various embodiments, a method for providing 5th Generation (5G) data services during a voice call in a Dual Subscriber Identity Module (SIM) User Equipment (UE) 500 may be provided, and the method may comprise receiving, by the UE 500, an incoming voice call on a first SIM, while availing 5G data services from a 5G network through a second SIM, wherein Default Data Subscription/Service (DDS) is set to the second SIM, and performing one of:

forwarding, by the UE 500, the voice call to the second SIM; or performing one of: requesting, by the UE 500, the 5G network to convert the voice call to a Voice over New Radio (VoNR) call, while availing the 5G data services through the second SIM, requesting, by the UE 500, the 5G network to add a SCG bearer over the second SIM for availing the 5G data services through the second SIM while engaging in the voice call, rejecting, by the UE 500, the voice call and sending a message through the first SIM including a phone number associated with the second SIM to indicate to the calling user to call on the second SIM, while availing the 5G data services through the second SIM, or triggering, by the UE 500, an Internet protocol Multimedia Subsystem (IMS) registration with a 5G network over the second SIM through a Non-3GPP Access Inter-Working Function (N3IWF) for engaging in the voice call while availing the 5G data services through the second SIM.

According to various embodiments, converting the voice call to a Voice over New Radio (VoNR) call for availing voice call services comprises communicating, by the UE 500, to the 5G network about 5G capability of the second SIM, and providing, by the 5G network, an indication to the UE 500 to switch the voice call to VoNR call, on the 5G network determining that the voice call can be converted to the VoNR call.

According to various embodiments, a User Equipment (UE) 500 for providing 5th Generation (5G) data services during a voice call, wherein the UE 500 is a Dual Subscriber Identity Module (SIM) UE 500 may be provided, and the UE 500 may be configured to: determine initiation of a voice call on a first SIM, while availing 5G data services through the first SIM, wherein the initiation of the voice call leads to a fallback from 5G Radio Access Technology (RAT), wherein Default Data Subscription/Service (DDS) is set to the first SIM, register with a 5G network through a second SIM, if the second SIM is registered with a wireless network, and availing, by the UE 500, the 5G data services from the second SIM, while engaging in the voice call on the first SIM.

According to various embodiments, the UE 500 may be configured to avail the 5G data services from the second SIM by setting a 5G mode to the second SIM, if the second SIM had not been set to 5G mode, switching the DDS from the first SIM to the second SIM, and moving a 5G antenna present in the UE 500 from the first SIM to the second SIM.

According to various embodiments, the UE 500 may be configured to automatically trigger setting the 5G mode to the second SIM and switching the DDS from the first SIM to the second SIM.

According to various embodiments, the UE 500 may be configured to manually set the 5G mode to the Second SIM and switch the DDS from the first SIM to the second SIM.

According to various embodiments, the UE 500 may be configured to automatically trigger movement of the 5G antenna present in the UE 500 from the first SIM to the second SIM.

According to various embodiments, the UE 500 may be configured to move the 5G antenna present in the UE 500 manually from the first SIM to the second SIM.

According to various embodiments, the UE 500 may be configured to support simultaneous reception of Voice over Long Term Evolution (VoLTE) calls and 5G data services through the first SIM and the second SIM.

According to various embodiments, a User Equipment (UE) 500 for providing 5th Generation (5G) data services during a voice call may be provided, the UE 500 may be a Dual Subscriber Identity Module (SIM) UE 500, and the UE 500 may be configured to: determine initiation of a voice call on a first SIM, while availing 5G data services a second SIM, wherein Default Data Subscription/Service (DDS) is set to the second SIM, trigger a registration with a 5G network through the first SIM, and perform one of: request to the 5G network to convert the voice call to a Voice over New Radio (VoNR) call for availing voice call services while availing the 5G data services through the first SIM, or request to the 5G network to add a Secondary Cell Group (SCG) bearer over the first SIM for availing the 5G data services through the first SIM, while engaging in the voice call.

According to various embodiments, the UE 500 may be configured to trigger a registration with a 5G network through the first SIM by setting the 5G mode to the first SIM, if the first SIM had not been set to 5G mode, switching the DDS from the second SIM to the first SIM, and moving a 5G antenna present in the UE 500 from the second SIM to the first SIM.

According to various embodiments, the UE 500 may be configured to automatically trigger setting the 5G mode to the first SIM and switching the DDS from the second SIM to the first SIM.

According to various embodiments, the UE 500 may be configured to manually set the 5G mode to the first SIM and the DDS is switched from the second SIM to the first SIM.

According to various embodiments, the UE 500 may be configured to automatically trigger movement of the 5G antenna present in the UE 500 from the second SIM to the first SIM.

According to various embodiments, the UE 500 may be configured to move the 5G antenna present in the UE 500 manually from the second SIM to the first SIM.

According to various embodiments, the UE 500 may be configured to convert the voice call to a Voice over New Radio (VoNR) call for availing voice call services by communicating to the 5G network about 5G capability of the first SIM, and providing an indication to the UE 500 to switch the voice call to VoNR call, on the 5G network determining that the voice call can be converted to the VoNR call.

According to various embodiments, a User Equipment (UE) 500 for providing 5th Generation (5G) data services during a voice call may be provided, the UE 500 may be a Dual Subscriber Identity Module (SIM) UE 500, and the UE 500 may be configured to: receive an incoming voice call on a first SIM, while availing 5G data services from a 5G network through a second SIM, wherein Default Data Subscription/Service (DDS) is set to the second SIM, and perform one of: forward the voice call to the second SIM, or perform one of: request the 5G network to convert the voice call to a Voice over New Radio (VoNR) call, while availing the 5G data services through the second SIM, request, the 5G network to add a SCG bearer over the second SIM for availing the 5G data services through the second SIM while engaging in the voice call, reject the voice call and sending a message through the first SIM including a phone number associated with the second SIM to indicate to the calling user to call on the second SIM, while availing the 5G data services through the second SIM, or trigger an Internet protocol Multimedia Subsystem (IMS) registration with a 5G network over the second SIM through a Non-3GPP Access Inter-Working Function (N3IWF) for engaging in the voice call while availing the 5G data services through the second SIM.

According to various embodiments, the UE 500 may be configured to convert the voice call to a Voice over New Radio (VoNR) call for availing voice call services by communicating to the 5G network about 5G capability of the second SIM, and providing an indication to the UE 500 to switch the voice call to VoNR call, on the 5G network determining that the voice call can be converted to the VoNR call.

Although the present disclosure has been described with various embodiments, various changes and modifications may be suggested to one skilled in the art. It is intended that the present disclosure encompass such changes and modifications as fall within the scope of the appended claims.

What is claimed is:

1. An operating method of an electronic device, the operating method comprising:
    determining initiation of a voice call on a first Subscriber Identity Module (SIM) which is registered with a first network with a first radio access technology (RAT), while availing first data services through the first SIM, wherein the initiation of a voice call leads to a fallback of the first SIM from the first RAT, wherein a Default Data Subscription/Service (DDS) is set to the first SIM;
    registering with the first network through a second SIM which is different from the first SIM, in response to the initiation of the voice call on the first SIM and determining the second SIM is registered with a second network with a second RAT; and
    availing the first data services from the second SIM that is registered with the first network, while engaging in the voice call on the first SIM.

2. The operating method of claim 1, wherein availing the first data services from the second SIM comprises:
    setting a first mode to the second SIM, in response to determining the second SIM is not set to the first mode;
    switching the DDS from the first SIM to the second SIM; and
    switching a first antenna present in the electronic device from being set to the first SIM to being set to the second SIM.

3. The operating method of claim 2, wherein setting the first mode to the second SIM and switching the DDS from the first SIM to the second SIM are automatically triggered by the electronic device.

4. The operating method of claim 2, wherein the first mode is set to the second SIM and the DDS is switched from the first SIM to the second SIM according to a setting selected by an input via a user interface (UI).

5. The operating method of claim 2, wherein switching the first antenna present in the electronic device from being set to the first SIM to being set to the second SIM is automatically triggered by the electronic device.

6. The operating method of claim 2, wherein the switching of the first antenna present in the electronic device from being set to the first SIM to being set to the second SIM includes switching according to a setting selected by an input via a user interface (UI).

7. The operating method of claim 1, wherein the electronic device supports simultaneous reception of Voice over Long Term Evolution (VOLTE) calls and the first data services through the first SIM and the second SIM.

8. An operating method of an electronic device, the operating method comprising:
    determining initiation of a voice call on a first Subscriber Identity Module (SIM), while availing first data services on a second SIM, wherein Default Data Subscription/Service (DDS) is set to the second SIM;
    triggering a registration with a first network through the first SIM; and
    performing one of:
        requesting to the first network to convert the voice call to a first call for availing voice call services while availing the first data services through the first SIM; or
        requesting to the first network to add a Secondary Cell Group (SCG) bearer over the first SIM for availing the first data services through the first SIM, while engaging in the voice call.

9. The operating method of claim 8, wherein triggering a registration with a first network through the first SIM comprises:
    setting a first mode to the first SIM, in response to determining the first SIM is not set to the first mode;
    switching the DDS from the second SIM to the first SIM; and
    switching a first antenna present in the electronic device from being set to the second SIM to being set to the first SIM.

10. The operating method of claim 9, wherein setting the first mode to the first SIM and switching the DDS from the second SIM to the first SIM are automatically triggered by the electronic device.

11. The operating method of claim 9, wherein setting the first mode to the first SIM and switching the DDS from the second SIM to the first SIM are performed according to a setting selected by an input via a user interface (UI).

12. The operating method of claim 9, wherein switching the first antenna present in the electronic device from being set to the second SIM to being set to the first SIM is automatically triggered by the electronic device.

13. The operating method of claim 9, wherein switching the first antenna present in the electronic device from being set to the second SIM to being set to the first SIM includes switching according to a setting selected by an input via a user interface (UI).

14. The operating method of claim 8, wherein converting the voice call to a first call for availing voice call services comprises:
    communicating to the first network about first capability of the first SIM; and
    receiving an indication, provided by the first network to the electronic device, to switch the voice call to the first call, based on the first network determining that the voice call is to be converted to the first call.

15. An operating method of an electronic device, the operating method comprising:
    receiving, an incoming voice call on a first Subscriber Identity Module (SIM), while availing first data services from a first network through a second SIM, wherein Default Data Subscription/Service (DDS) is set to the second SIM; and
    performing one of:
        forwarding the voice call to the second SIM; or
        performing one of:
            requesting the first network to convert the voice call to a first call, while availing the first data services through the second SIM;
            requesting the first network to add a Secondary Cell Group (SCG) bearer over the second SIM for availing the first data services through the second SIM while engaging in the voice call;
            rejecting the voice call and sending a message through the first SIM, the message including a phone number associated with the second SIM to indicate to a caller associated with the rejected voice call to call on the second SIM, while availing the first data services through the second SIM; or
            triggering an Internet protocol Multimedia Subsystem (IMS) registration with a first network over the second SIM through a Non-3GPP Access Inter-Working Function (N3IWF) for engaging in the voice call while availing the first data services through the second SIM.

16. The operating method of claim 15, wherein converting the voice call to a first call for availing voice call services comprises:
  communicating to the first network about 5G capability of the second SIM; and
  receiving an indication, provided by the first network to the electronic device, to switch the voice call to the first call, based on the first network determining that the voice call can be converted to the first call.

17. An electronic device, comprising:
  a communication circuit; and
  at least one processor operatively connected to the communication circuit,
  wherein the at least one processor is configured to:
    determine initiation of a voice call on a first Subscriber Identity Module (SIM) which is registered with a first network with a first radio access technology (RAT), while availing first data services through the first SIM, wherein the initiation of a voice call leads to a fallback of the first SIM from the first RAT, wherein a Default Data Subscription/Service (DDS) is set to the first SIM;
    register with the first network through a second SIM which is different from the first SIM, in response to determining the initiation of the voice call on the first SIM and determining the second SIM is registered with a second network with a second RAT; and
    avail the first data services from the second SIM, while engaging in the voice call on the first SIM.

18. The electronic device of claim 17, wherein the at least one processor is configured to avail the first data services from the second SIM by:
  setting a first mode to the second SIM, if the second SIM is not set to the first mode;
  switching the DDS from the first SIM to the second SIM; and
  switching a first antenna present in the electronic device from being set to the first SIM to being set to the second SIM.

19. The electronic device of claim 18, wherein the at least one processor is configured to automatically trigger setting the first mode to the second SIM and switching the DDS from the first SIM to the second SIM.

20. The electronic device of claim 18, wherein the at least one processor is configured to: set, according to a setting selected by an input via a user interface (UI), the first mode to the second SIM; and switch, according to a setting selected by an input via the UI, the DDS from the first SIM to the second SIM.

* * * * *